(12) United States Patent
Karwan et al.

(10) Patent No.: US 11,599,596 B2
(45) Date of Patent: Mar. 7, 2023

(54) SYSTEMS AND METHODS FOR OPTIMIZING A WEBPAGE BASED ON HISTORICAL AND SEMANTIC OPTIMIZATION OF WEBPAGE DECISION TREE STRUCTURES

(71) Applicant: GROUPON, INC., Chicago, IL (US)

(72) Inventors: Adam Karwan, Gliwice (PL); Anna Bolek, Libiąż (PL); Filip Krawiec, Sosnowiec (PL); Mirosław Forystek, Katowice (PL)

(73) Assignee: GROUPON, INC., Chicago, IL (US)

( * ) Notice: Subject to any disclaimer, the term of this patent is extended or adjusted under 35 U.S.C. 154(b) by 783 days.

(21) Appl. No.: 16/566,658

(22) Filed: Sep. 10, 2019

(65) Prior Publication Data

US 2020/0081934 A1 Mar. 12, 2020

Related U.S. Application Data

(60) Provisional application No. 62/729,745, filed on Sep. 11, 2018.

(51) Int. Cl.
| | |
|---|---|
| *G06F 16/957* | (2019.01) |
| *G06N 5/04* | (2023.01) |
| *G06N 5/00* | (2023.01) |
| *G06F 16/22* | (2019.01) |
| *G06F 3/0482* | (2013.01) |
| *H04L 41/5061* | (2022.01) |
| *H04L 41/5074* | (2022.01) |
| *H04L 67/306* | (2022.01) |

(Continued)

(52) U.S. Cl.
CPC ........ *G06F 16/9574* (2019.01); *G06F 3/0482* (2013.01); *G06F 16/2246* (2019.01); *G06N 5/003* (2013.01); *G06N 5/04* (2013.01); *H04L 41/5061* (2013.01); *H04L 41/5064* (2013.01); *H04L 41/5074* (2013.01); *H04L 67/306* (2013.01); *H04L 67/75* (2022.05); *H04M 3/5191* (2013.01)

(58) Field of Classification Search
None
See application file for complete search history.

(56) References Cited

U.S. PATENT DOCUMENTS

| | | |
|---|---|---|
| 8,375,329 B2 | 2/2013 | Drayton et al. |
| 2008/0147651 A1 | 6/2008 | Bhogal et al. |

(Continued)

*Primary Examiner* — Howard Cortes
(74) *Attorney, Agent, or Firm* — Alston & Bird LLP

(57) ABSTRACT

Computing systems, computing apparatuses, computing methods, and computer program products are disclosed for optimizing a webpage. An example computing method includes determining a first average number of clicks (ANC) value for a first set of webpage nodes based on first webpage decision tree data and historical usage data. The example computing method further includes generating semantic grouping data for the first set of webpage nodes based on the first webpage decision tree data and webpage node description data. The example computing method further includes determining a second ANC value based on the first set of webpage nodes. The example computing method further includes generating, based on the second ANC value and the semantic grouping data, second webpage decision tree data.

20 Claims, 31 Drawing Sheets

(51) Int. Cl.
*H04M 3/51* (2006.01)
*H04L 67/75* (2022.01)

(56) References Cited

U.S. PATENT DOCUMENTS

| | | |
|---|---|---|
| 2009/0282106 A1 | 11/2009 | Jaffer et al. |
| 2013/0268468 A1* | 10/2013 | Vijayaraghavan ..... G06N 20/00 706/12 |
| 2015/0178371 A1 | 6/2015 | Seth et al. |
| 2016/0180372 A1* | 6/2016 | Lu ..................... G06Q 30/0242 705/14.41 |
| 2017/0091670 A1* | 3/2017 | Gulin ..................... G06N 20/00 |
| 2017/0277667 A1 | 9/2017 | Weston et al. |
| 2017/0329856 A1* | 11/2017 | Jiang ..................... H04L 67/306 |
| 2019/0146647 A1 | 5/2019 | Ramchandran et al. |

* cited by examiner

702
ANC FOR NAIVE: 4.0
TREE DEPTH: 4

GREEDY APPROACH:
AT 1 LEVEL: 3.19
AT 2 LEVEL: 2.73
AT 3 LEVEL: 3.03

700

| 704 | GREEDY 1 | EXPECTED NUMBER OF CLICKS | | ANC |
|---|---|---|---|---|
| | | 591038 | 79.80% | 3.19 |
| | | IMPROVEMENT | 20.20% | |

| 706 | GREEDY 2 | EXPECTED NUMBER OF CLICKS | | ANC |
|---|---|---|---|---|
| | | 505910 | 68.30% | 2.73 |
| | | IMPROVEMENT | 31.70% | |

| 708 | GREEDY 3 | EXPECTED NUMBER OF CLICKS | | ANC |
|---|---|---|---|---|
| | | 561663 | 75.83% | 3.03 |
| | | IMPROVEMENT | 24.17% | |

```
Number; Category; Subcategory; #Macros; MacroName; MacroCodeLevel; #Clicks; CategoryLabel; SubCategoryLabel; #clicksSubCategory; #ClicksCategory
0; Goods; Refund Return; 5; Return item shipping label; 3; 5234; 1; 1; 23707; 38564
1; Goods; Refund Return; 5; Final sale no refund/return; 3; 4322; 1; 1; 23707; 38564
2; Goods; Refund Return; 5; Cancel >2hrs return; 3; 5256; 1; 1; 23707; 38564
3; Goods; Refund Return; 5; Cancel <2hrs refund; 3; 3553; 1; 1; 23707; 38564
4; Goods; Refund Return; 5; Sugar refund; 3; 5342; 1; 1; 23707; 38564
5; Goods; Delivery; 4; Edit address <2hr; 3; 5432; 1; 2; 14857; 38564
6; Goods; Delivery; 4; Dead tracking refund; 3; 532; 1; 2; 14857; 38564
7; Goods; Delivery; 4; tracking delivered No package OTE; 3; 6537; 1; 2; 14857; 38564
8; Goods; Delivery; 4; Edit address >2hr; 3; 2356; 1; 2; 14857; 38564
9; Local; Refunds; 6; <3cd; 3; 13256; 2; 3; 45588; 87903
10; Local; Refunds; 6; >3cd; 3; 6544; 2; 3; 45588; 87903
11; Local; Refunds; 6; Final scale; 3; 5672; 2; 3; 45508; 87903
12; Local; Refunds; 6; CX Not eligible; 3; 7345; 2; 3; 45508; 87903
13; Local; Refunds; 6; Groupon S refund; 3; 2345; 2; 3; 45508; 87903
14; Local; Refunds; 6; Trade in; 3; 6346; 2; 3; 45508; 87903
15; Local; Code issues; 6; Code not valid (instructions); 3; 4623; 2; 4; 42395; 87903
16; Local; Code issues; 6; Escalation Or TradeIn; 3; 9571; 2; 4; 42395; 87903
17; Local; Code issues; 6; Escalation Cash Refund 24hrs; 3; 7637; 2; 4; 42395; 87903
18; Local; Code issues; 6; Escalation Credit Refund 24hrs; 3; 2346; 2; 4; 42395; 87903
19; Local; Code issues; 6; Expired Voucher; 3; 8644; 2; 4; 42395; 87903
20; Local; Code issues; 6; Mistakenly redeemed; 3; 9574; 2; 4; 42395; 87903
21; Live; Live; 3; Ticket not received; 2; 4132; 3; 5; 19239; 19239
22; Live; Live; 3; Final sale no refund; 2; 6453; 3; 5; 19239; 19239
23; Live; Live; 3; >24hrs no refund; 2; 8664; 3; 5; 19239; 19239
24; Account; Account; 3; Password reset; 2; 12346; 4; 6; 120606; 120606
25; Account; Account; 3; Refund status; 2; 73538; 4; 6; 120606; 120606
26; Account; Account; 3; Failed Order; 2; 34683; 4; 6; 120606; 120606
27; Quick Common; Quick Common; 5; Escalation; 2; 1275; 5; 7; 6912; 6912
28; Quick Common; Quick Common; 5; Trade in; 3; 1594; 5; 7; 6912; 6912
29; Quick Common; Quick Common; 5; Refund issued OFP; 2; 1784; 5; 7; 6912; 6912
30; Quick Common; Quick Common; 5; GS for inconvinience; 2; 974; 5; 7; 6912; 6912
31; Quick Common; Quick Common; 5; No phone calls; 2; 1285; 5; 7; 6912; 6912
32; Chat Flow; Welcome; 5; Hello #1 What's the problem?; 3; 837; 6; 8; 2803; 15037
33; Chat Flow; Welcome; 5; Hello #2 Can you wait?; 3; 473; 6; 8; 2803; 15037
34; Chat Flow; Welcome; 5; Hello #3 Apology; 3; 324; 6; 8; 2803; 15037
35; Chat Flow; Welcome; 5; Hello #4 all details provided I'm on it!; 3; 843; 6; 8; 2803; 15037
36; Chat Flow; Welcome; 5; Hello #5 What deal?; 3; 326; 6; 8; 2803; 15037
37; Chat Flow; Wait; 6; Please Hold; 3; 865; 6; 5; 4088; 15037
38; Chat Flow; Wait; 6; Wait, Supervisor; 3; 4355; 6; 9; 4088; 15037
39; Chat Flow; Wait; 6; Thanks for waiting; 3; 865; 6; 9; 4088; 15037
40; Chat Flow; Wait; 6; Still Checking; 3; 123; 6; 9; 4088; 15037
41; Chat Flow; Wait; 6; Wait 2 minutes; 3; 864; 6; 9; 4088; 15037
42; Chat Flow; Wait; 6; Give me a minute; 3; 936; 6; 9; 4088; 15037
43; Chat Flow; Else; 3; More questions?; 3; 1737; 6; 10; 3281; 15037
44; Chat Flow; Else; 3; Further assistance?; 3; 932; 6; 10; 3281; 15037
45; Chat Flow; Else; 3; Sorry I couldn't help more; 3; 612; 6; 10; 3281; 15037
46; Chat Flow; Idle; 4; Away #1; 3; 627; 6; 11; 2644; 15037
47; Chat Flow; Idle; 4; Away #2; 3; 833; 6; 11; 2644; 15037
48; Chat Flow; Idle; 4; Close 1 min left; 3; 838; 6; 11; 2644; 15037
49; Chat Flow; Idle; 4; Close chat; 3; 346; 6; 11; 2644; 15037
50; Chat Flow; Bye; 4; Hope you're happy; 3; 934; 6; 12; 2221; 15037
51; Chat Flow; Bye; 4; Thanks for contact; 3; 237; 6; 12; 2221; 15037
52; Chat Flow; Bye; 4; Thanks for chatting; 3; 783; 6; 12; 2221; 15037
53; Chat Flow; Bye; 4; contact us again; 3; 267; 6; 12; 2221; 15037
```

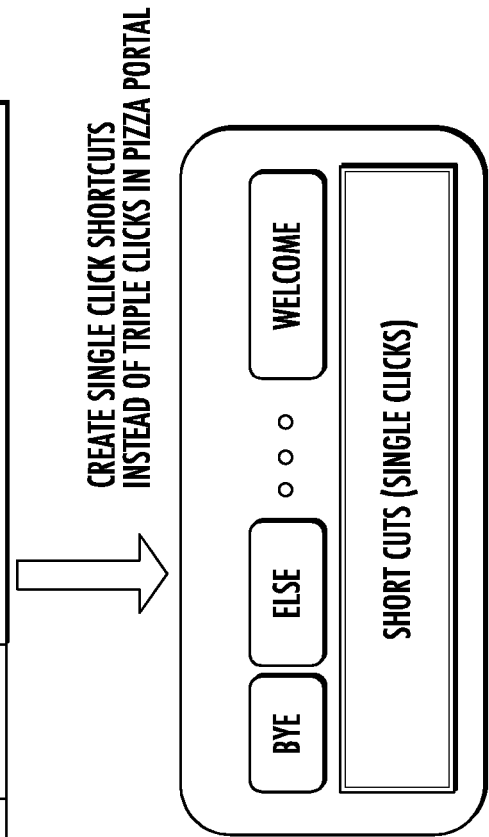
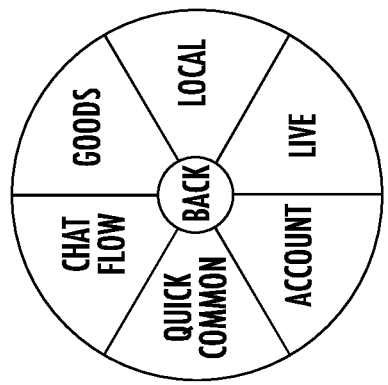
FIG. 27

| 2902 CATEGORY | 13 - 23Apr % | 24 - 30Apr % | 1 - 7May % | 13Apr - 7May % | 13Apr - 7May % |
|---|---|---|---|---|---|
| 1 | 9.8 | 9.5 | 9.9 | 27506 | 9.7 |
| 2 | 52.0 | 50.9 | 52.5 | 146557 | 51.8 |
| 3 | 13.8 | 13.8 | 12.4 | 37922 | 13.4 |
| 4 | 20.0 | 20.5 | 19.5 | 56681 | 20.0 |
| 5 | 4.5 | 5.3 | 5.7 | 14304 | 5.1 |

| 2904 SUBCATEGORY | 13 - 23Apr % | 24 - 30Apr % | 1 - 7May % | 13Apr - 7May % | 13Apr - 7May % |
|---|---|---|---|---|---|
| A | 8.4 | 8.1 | 8.2 | 23336 | 8.2 |
| B | 1.3 | 1.4 | 1.7 | 4170 | 1.5 |
| C | 2.1 | 2.4 | 2.4 | 6499 | 2.3 |
| D | 4.3 | 4.0 | 4.0 | 11677 | 4.1 |
| E | 15.4 | 15.3 | 16.1 | 44105 | 15.6 |
| F | 20.3 | 19.9 | 20.8 | 57534 | 20.3 |
| G | 9.8 | 9.2 | 9.2 | 26742 | 9.5 |
| H | 3.4 | 3.6 | 3.5 | 9845 | 3.5 |
| I | 7.8 | 8.0 | 7.2 | 21728 | 7.7 |
| J | 14.3 | 14.4 | 14.1 | 40333 | 14.3 |
| K | 0.3 | 0.2 | 0.3 | 735 | 0.3 |
| L | 0.1 | 0.1 | 0.1 | 175 | 0.1 |
| M | 2.7 | 3.2 | 2.6 | 7968 | 2.8 |
| N | 2.7 | 2.7 | 2.5 | 7470 | 2.6 |
| O | 3.5 | 4.2 | 4.5 | 11297 | 4.0 |
| Q | 0.8 | 0.9 | 0.9 | 2408 | 0.9 |
| R | 0.2 | 0.2 | 0.2 | 599 | 0.2 |
| S | 2.6 | 2.3 | 1.7 | 6349 | 2.2 |

FIG. 29

SYSTEMS AND METHODS FOR OPTIMIZING A WEBPAGE BASED ON HISTORICAL AND SEMANTIC OPTIMIZATION OF WEBPAGE DECISION TREE STRUCTURES

CROSS-REFERENCE TO RELATED APPLICATIONS

This application claims the benefit of U.S. Provisional Application No. 62/729,745, entitled "SYSTEMS AND METHODS FOR OPTIMIZING A WEBPAGE BASED ON HISTORICAL AND SEMANTIC OPTIMIZATION OF WEBPAGE DECISION TREE STRUCTURES", and filed Sep. 11, 2018, the entire contents of which are hereby incorporated by reference.

BACKGROUND

The inventors have discovered problems with existing mechanisms for webpage optimization. Through applied effort, ingenuity, and innovation, the inventors has solved many of these identified problems by developing solutions embodied by the present disclosure and described in detail below.

BRIEF SUMMARY

Systems, apparatuses, methods, and computer program products are disclosed herein for optimizing webpages. The webpage optimization system provided herein solves the above problems by generating an optimized webpage decision tree structure based on, for example, historical optimization (e.g., minimizing the webpage decision tree structure's average number of clicks (ANC) value), semantical optimization (e.g., applying unsupervised natural language processing (NLP) clustering), or both.

In one example embodiment, a computing system is provided for optimizing a webpage. The computing system may comprise decision tree analysis (DTA) circuitry configured to receive first webpage decision tree data comprising a first webpage decision tree structure for a first set of webpage nodes. The DTA circuitry may be further configured to receive historical usage data comprising a historical number of clicks (HNC) value for each webpage node in the first set of webpage nodes. The DTA circuitry may be further configured to determine a first average number of clicks (ANC) value for the first set of webpage nodes based on the first webpage decision tree data and the historical usage data. The computing system may further comprise natural language processing (NLP) circuitry in communication with the DTA circuitry. The NLP circuitry may be configured to receive webpage node description data comprising a textual description data structure for each webpage node in the first set of webpage nodes. The NLP circuitry may be further configured to generate semantic grouping data for the first set of webpage nodes based on the first webpage decision tree data and the webpage node description data. The computing system may further comprise decision tree optimization (DTO) circuitry in communication with the DTA circuitry and the NLP circuitry. The DTO circuitry may be configured to determine a second ANC value based on the first set of webpage nodes. The second ANC value may be less than the first ANC value. The DTO circuitry may be further configured to generate, based on the second ANC value and the semantic grouping data, second webpage decision tree data indicative of a second webpage decision tree structure for a second set of webpage nodes.

In another example embodiment, a computing apparatus is provided for optimizing a webpage. The computing apparatus may comprise decision tree analysis (DTA) circuitry configured to receive first webpage decision tree data comprising a first webpage decision tree structure for a first set of webpage nodes. The DTA circuitry may be further configured to receive historical usage data comprising a historical number of clicks (HNC) value for each webpage node in the first set of webpage nodes. The DTA circuitry may be further configured to determine a first average number of clicks (ANC) value for the first set of webpage nodes based on the first webpage decision tree data and the historical usage data. The computing apparatus may further comprise natural language processing (NLP) circuitry in communication with the DTA circuitry. The NLP circuitry may be configured to receive webpage node description data comprising a textual description data structure for each webpage node in the first set of webpage nodes. The NLP circuitry may be further configured to generate semantic grouping data for the first set of webpage nodes based on the first webpage decision tree data and the webpage node description data. The computing apparatus may further comprise decision tree optimization (DTO) circuitry in communication with the DTA circuitry and the NLP circuitry. The DTO circuitry may be configured to determine a second ANC value based on the first set of webpage nodes. The second ANC value may be less than the first ANC value. The DTO circuitry may be further configured to generate, based on the second ANC value and the semantic grouping data, second webpage decision tree data indicative of a second webpage decision tree structure for a second set of webpage nodes.

In another example embodiment, a computing method is provided for optimizing a webpage. The computing method may comprise receiving, by decision tree analysis (DTA) circuitry, first webpage decision tree data comprising a first webpage decision tree structure for a first set of webpage nodes. The computing method may further comprise receiving, by the DTA circuitry, historical usage data comprising a historical number of clicks (HNC) value for each webpage node in the first set of webpage nodes. The computing method may further comprise determining, by the DTA circuitry, a first average number of clicks (ANC) value for the first set of webpage nodes based on the first webpage decision tree data and the historical usage data. The computing method may further comprise receiving, by natural language processing (NLP) circuitry in communication with the DTA circuitry, webpage node description data comprising a textual description data structure for each webpage node in the first set of webpage nodes. The computing method may further comprise generating, by the NLP circuitry, semantic grouping data for the first set of webpage nodes based on the first webpage decision tree data and the webpage node description data. The computing method may further comprise determining, by decision tree optimization (DTO) circuitry in communication with the DTA circuitry and the NLP circuitry, a second ANC value based on the first set of webpage nodes. The second ANC value may be less than the first ANC value. The computing method may further comprise generating, by the DTO circuitry based on the second ANC value and the semantic grouping data, second webpage decision tree data indicative of a second webpage decision tree structure for a second set of webpage nodes.

In another example embodiment, a computer program product for optimizing a webpage. The computer program product may comprise at least one non-transitory computer-readable storage medium storing computer-executable program code instructions that, when executed by a computing system, cause the computing system to receive, by decision tree analysis (DTA) circuitry, first webpage decision tree data comprising a first webpage decision tree structure for a first set of webpage nodes. The computer-executable program code instructions, when executed by the computing system, may further cause the computing system to receive, by the DTA circuitry, historical usage data comprising a historical number of clicks (HNC) value for each webpage node in the first set of webpage nodes. The computer-executable program code instructions, when executed by the computing system, may further cause the computing system to determine, by the DTA circuitry a first average number of clicks (ANC) value for the first set of webpage nodes based on the first webpage decision tree data and the historical usage data. The computer-executable program code instructions, when executed by the computing system, may further cause the computing system to receive, by natural language processing (NLP) circuitry in communication with the DTA circuitry, webpage node description data comprising a textual description data structure for each webpage node in the first set of webpage nodes. The computer-executable program code instructions, when executed by the computing system, may further cause the computing system to generate, by the NLP circuitry, semantic grouping data for the first set of webpage nodes based on the first webpage decision tree data and the webpage node description data. The computer-executable program code instructions, when executed by the computing system, may further cause the computing system to determine, by decision tree optimization (DTO) circuitry in communication with the DTA circuitry and the NLP circuitry, a second ANC value based on the first set of webpage nodes. The second ANC value may be less than the first ANC value. The computer-executable program code instructions, when executed by the computing system, may further cause the computing system to generate, by the DTO circuitry based on the second ANC value and the semantic grouping data, second webpage decision tree data indicative of a second webpage decision tree structure for a second set of webpage nodes.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE DRAWINGS

The accompanying drawings, which are not necessarily drawn to scale, illustrate embodiments and features of the present disclosure. Together with the specification, including the brief summary above and the detailed description below, the accompanying drawings serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the drawings while not departing from the scope of the disclosure.

FIG. 7 illustrates example data 700 in accordance with some example embodiments.

FIG. 14 illustrates an example comma separated value (CSV) data file 1400 in accordance with some example embodiments.

FIG. 15 illustrates an example spreadsheet 1500 in accordance with some example embodiments.

FIG. 27 illustrates example data 2700 comprising an example potential optimization report in accordance with some example embodiments.

FIG. 29 illustrates example data 2900 comprising example statistical data in accordance with some example embodiments.

DETAILED DESCRIPTION

Figure 1:
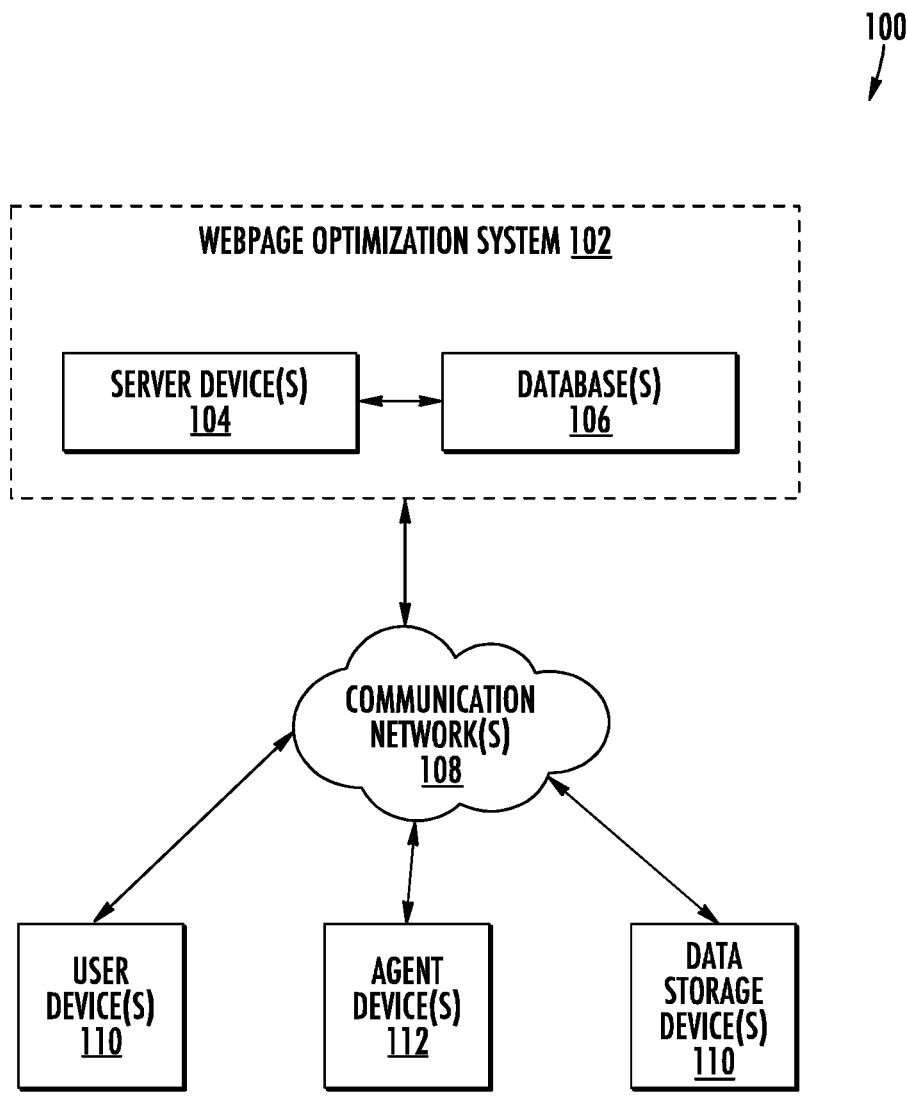
FIG. 1 illustrates an example system diagram 100 in accordance with some example embodiments.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, computing systems, computing apparatuses, computing methods, and computer program products are described herein that provide for optimizing webpages and webpage decision tree structures. Traditionally, decision tree (DT) is a data structure that is implemented as a backend for many customer support services. The webpage optimization system described herein provides novel methods for optimizing DTs based on historical data (e.g., number of clicks per item) and textual data (e.g., contact reasons, chats, emails). For example, DT optimization may be based on historical user preferences (e.g., minimization of the ANC value) and natural language processes (e.g., unsupervised clustering). As an output, the webpage optimization system described herein may automatically generate more optimal categories to simplify services navigation. As a result of the DT optimization, the webpage optimization system described herein may generate a new, robust navigation model (e.g., a new decision tree) and apply that new model to webpages and mobile applications. Moreover, the webpage optimization system described herein may support optimal web and mobile application navigation, dialog systems, chat bots, FAQ, help, questionnaire forms, survey forms, and any other system tracking user behavior. In some embodiments, the webpage optimization system described herein may provide for personalized optimization for an aggregated group of users based on, for example, geolocation data (e.g., Chicago, United States; Chennai, India; Katowice, Poland; Warsaw, Poland).

In some embodiments, the webpage optimization system described herein relates to a DTO application with visualization functionality, such as a standalone desktop graphical user interface (GUI) application or a cloud-based web services application or software suite. The DTO application may be used by agents to optimize an organization's global decision tree structure and thereby speed up agent duties. Further, the DTO application may be used for both internal improvements (e.g., reorganization of a decision tree with macro codes used by agents; intranet web page for more optimal navigation) and external improvements (e.g., optimal WWW and mobile navigation; chat bot and dialog system; FAQ; help; questionnaire forms; displaying and proposing mostly chosen deals (e.g., recommendation system)).

There are many advantages of these and other embodiments described herein, such as: simplifying the navigation and searching of webpage content minimizing the number of clicks for simplified content exploration; saving time for users (customers, agents, and merchants) when exploring webpages due to the minimized number of clicks and simplified content exploration; providing more optimal interfaces that are more intuitive for users to navigate; displaying and proposing the mostly chosen content; and improving the accuracy of machine learning prediction algorithms and the precision of recommendations (e.g., per single user). These advantages may be applied to any service to simplify browsing, and may be personalized per user or group and per localization. In one implementation, by rebuilding webpage decision tree structures and allowing biweekly changes of customer policy, the embodiments disclosed herein will speed up macro and reason code navigation. As a result, agents may identify and solve issues faster and more intuitively. Further, the embodiments disclosed herein may be implemented to optimize any system that tracks user behavior.

The systems, apparatuses, methods, and computer program products disclosed herein may be implemented based on any computer language and may be adapted to any business case with additional domain knowledge including specific restrictions. The differences between these computer languages may be visible in achieved performance and accuracy of implemented methods.

In some embodiments, the systems, apparatuses, methods, and computer program products disclosed herein may apply the concepts disclosed herein for customer service support. In some embodiments, any place where user's choices are monitored and tracked may be mapped to the decision tree structure and optimized. For example, other possible applications may comprise the optimization of the content of bookshelves in libraries, goods in stores, warehouses, car rentals, or travel agencies. Based on historical decisions, the concepts disclosed herein may offer a new way of arranging mostly popular products. Such recommendations may facilitate the spreading of goods based on historical rentals, orders, and purchases. Therefore, through the tracking behavior of a group after optimization, the time needed to reach optimal product or service solutions for newcomers may be significantly shortened.

In some embodiments, the systems, apparatuses, methods, and computer program products disclosed herein may apply the concepts disclosed herein for any software services that track historical user behavior in cases of optimization. For example, the concepts disclosed herein may be applied for the distribution of folders and files in a computer, in a combination of circuitry, or on any cloud services in the way that presents historically mostly viewed content in the new optimal folder hierarchy. Optimization of the structure of directories and folders also may be applied for mobile devices, address books, shared folders with documents, image galleries, and any other suitable devices or data structures.

Definitions

As used herein, the terms "data," "data structure," "content," "information," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device or circuitry is described herein to receive data from a second computing device or circuitry, it will be appreciated that the data may be received directly from the second computing device or circuitry or may be received indirectly via one or more intermediary computing devices or circuitries, such as, for example, one or more servers, relays, routers, network access points, base stations, hosts, and/or the like, sometimes referred to herein as a "network." Similarly, where a first computing device or circuitry is described herein as sending data to a second computing device or circuitry, it will be appreciated that the data may be sent directly to the second computing device or circuitry or may be sent indirectly via one or more intermediary computing devices or circuitries, such as, for example, one or more servers, remote servers, cloud-based servers (e.g., cloud utilities), relays, routers, network access points, base stations, hosts, and/or the like.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in some embodiments," "in other embodiments," "in some instances," and the like generally mean that the particular feature, structure, or characteristic following the phrase may be included in at least one embodiment of the present disclosure, and may be included in more than one embodiment of the present disclosure (e.g., such phrases may not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "typically," "optionally," "generally," "additionally," "alternatively," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (e.g., applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), memory within the processors themselves, or a combination thereof. For instance, memory may be any non-transitory computer-readable storage medium having computer-readable instructions (e.g., computer-readable program code instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, kiosk computers, smartphones, smartwatches, headsets, smart speakers, and similar electronic devices equipped with at least a processor configured to perform the various operations described herein. Computing devices such as smartphones, laptop computers, tablet computers, headsets, and smartwatches are generally referred to herein as mobile devices.

The terms "server" and "server device" are used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "circuitry," "module," "utility," and other similar terms should be understood broadly to include hardware. In some embodiments, these terms may also include software for configuring the hardware. For example, in some embodiments, "circuitry" may include processing circuitry, memory, communications circuitry, input-output circuitry, other circuitry, or a combination thereof. In some embodiments, other elements of the present disclosure may provide or supplement the functionality of particular circuitry, modules, or utilities.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by a networked device, such as one or more servers, remote servers, cloud-based servers (e.g., cloud utilities), or other network entities, configured to communicate with one or more devices, such as one or more data set devices, user devices, or a combination thereof. Example embodiments of the user devices include any of a variety of stationary or mobile computing devices, such as a smartphone, laptop computer, tablet computer, desktop computer, electronic workstation, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to optimize webpages by determining ANC values and semantic grouping data for sets of webpage nodes and generating optimized webpage decision tree data for those sets of webpage nodes based on the determined ANC values and semantic grouping data. As illustrated, a webpage optimization system 102 may be connected to one or more server devices 104 in communication with one or more databases 106. The webpage optimization system 102 may be connected to one or more user devices 110, one or more agent devices 112, and one or more data storage devices 114 through one or more communications networks 108. In some embodiments, one or more communications networks 108 may comprise the Internet; Ethernet; a wireless local area network (LAN); a virtual private network (VPN); a cellular network; a satellite network; a proximity-based network; a wireless personal area network (PAN), any other suitable communications network; or any combination thereof. In some embodiments, the webpage optimization system 102 may be configured to optimize a webpage as described in further detail below.

The webpage optimization system 102 may be embodied as one or more specialized circuitries, computers, or computing systems. The one or more server devices 104 may be embodied as one or more servers, remote servers, cloud-based servers (e.g., cloud utilities), processors, or any other suitable server devices, or any combination thereof. The one or more server devices 104 receive, process, generate, and transmit data, signals, and electronic information to facilitate the operations of the webpage optimization system 102. The one or more databases 106 may be embodied as one or more data storage devices, such as a Network Attached Storage (NAS) device or devices, or as one or more separate databases or servers. The one or more databases 106 include information accessed and stored by the webpage optimization system 102 to facilitate the operations of the webpage optimization system 102. For example, the one or more databases 106 may store webpage decision tree data comprising webpage decision tree structures for sets of webpage nodes. The one or more databases 106 may further store historical usage data comprising historical number of clicks (HNC) values for each webpage node in the sets of webpage nodes. In some instances, the historical usage data may further comprise historical logs, historical user behavior data, or both. The one or more databases 106 may further store average number of clicks (ANC) values for sets of webpage nodes. The one or more databases 106 may further store webpage node description data comprising textual description data structures for each webpage node in the sets of webpage nodes. The one or more databases 106 may further store semantic grouping data for the sets of webpage nodes. The one or more databases 106 may further store ANC optimization techniques (e.g., naïve techniques, greedy techniques, exhaustive search techniques). The one or more databases 106 may further store NLP techniques (e.g., semantic grouping techniques, unsupervised clustering techniques). The one or more databases 106 may further store machine learning prediction data, decision tree recommendation data, or both. In some embodiments, the one or more databases 106 may store user account credentials for users of one or more user devices 110, one or more agent devices 112, data storage devices 114, or a combination thereof. In some embodiments, the one or more databases 106 may store data regarding device characteristics of one or more user devices 110, one or more agent devices 112, data storage devices 114, or a combination thereof.

The one or more user devices 110 may be embodied by one or more computing devices. Information received by the webpage optimization system 102 from the one or more user devices 110 may be provided in various forms and via various methods. For example, the one or more user devices 110 may be laptop computers, smartphones, netbooks, tablet computers, wearable devices, desktop computers, electronic workstations, or the like, and the information may be provided through various modes of data transmission provided by these user devices. In some embodiments, users may use one or more user devices 110 to click on one or more webpage nodes. The webpage optimization system 102, one or more remote server devices, or a combination thereof may receive electronic information indicative of the clicks and generate, based on the received electronic information, historical usage data comprising a historical number of clicks (HNC) value for each webpage node in the first set of webpage nodes.

The one or more agent devices 112 may be embodied by one or more computing devices. Information received by the webpage optimization system 102 from the one or more agent devices 112 may be provided in various forms and via various methods. For example, the one or more agent devices 112 may be laptop computers, smartphones, netbooks, tablet computers, wearable devices, desktop computers, electronic workstations, or the like, and the information may be provided through various modes of data transmission provided by these agent devices. In some embodiments, agents may use one or more agent devices 112 to display DTV data, load webpage decision tree data, and facilitate other operations of the webpage optimization system 102.

In embodiments where a user device 110 or an agent device 112 is a mobile device, such as a smartphone or tablet, the mobile device may execute an "app" (e.g., a thin-client application) to interact with the webpage optimization system 102 and/or one or more data storage devices 114. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., user devices, agent devices, data storage devices). Communication with hardware and software modules executing outside of the app is typically provided via application programming interfaces (APIs) provided by the mobile device operating system.

The one or more data storage devices 114 may be embodied by one or more computing devices, databases, or database servers. In some embodiments, the one or more data storage devices 114 may be embodied as one or more data storage devices, such as one or more NAS devices, or as one or more separate databases or database servers. In some embodiments, the one or more data storage devices 114 may be embodied as one or more servers, remote servers, cloud-based servers (e.g., cloud utilities), processors, or any other suitable devices, or any combination thereof. In some embodiments, the one or more data storage devices 114 may receive, process, store, generate, and transmit data, signals, and electronic information to facilitate the operations of the webpage optimization system 102. For example, the one or more data storage devices 114 may store webpage decision tree data, historical usage data, webpage node description data, one or more links or pointers thereto, or a combination thereof. Information received by the webpage optimization system 102 from one or more data storage devices 114 may be provided in various forms and via various methods. It will be understood, however, that in some embodiments, the one or more data storage devices 114 need not themselves be databases or database servers, but may be peripheral devices communicatively coupled to databases or database servers.

Additionally or alternatively, the one or more user devices 110, the one or more agent devices 112, the one or more data storage devices 114, or any combination thereof may interact with the webpage optimization system 102 over one or more communications networks 108. As yet another example, the one or more user devices 110, the one or more agent devices 112, the one or more data storage devices 114, or any combination thereof may include various hardware or firmware designed to interface with the webpage optimization system 102. For example, an example data storage device 114 may be a database server modified to communicate with the webpage optimization system 102, and another data storage device 114 may be a purpose-built device offered for the primary purpose of communicating with the webpage optimization system 102. As another example, an example user device 110 may be a user's laptop and may have an application stored thereon facilitating communication with the webpage optimization system 102, whereas another example user device 110 may be a user's smartphone and may have another application stored thereon facilitating communication with the webpage optimization system 102. As yet another example, an example agent device 112 may be an agent's computing device and may have an application stored thereon facilitating communication with the webpage optimization system 102, whereas another example agent device 112 may be a purpose-built device (e.g., an electronic workstation) offered for the primary purpose of communicating with the webpage optimization system 102.

In some embodiments, the webpage optimization system 102 may provide for receiving first webpage decision tree data comprising a first webpage decision tree structure for a first set of webpage nodes. The webpage optimization system 102 may receive the first webpage decision tree data from various sources, including but not necessarily limited to the one or more agent devices 112, the one or more data storage devices 114, or both. In some embodiments, the webpage optimization system 102 may provide for receiving historical usage data comprising a historical number of clicks (HNC) value for each webpage node in the first set of webpage nodes. The webpage optimization system 102 may receive the historical usage data from various sources, including but not necessarily limited to the one or more agent devices 112, the one or more data storage devices 114, or both. In some embodiments, the webpage optimization system 102 may provide for determining a first average number of clicks (ANC) value for the first set of webpage nodes based on the first webpage decision tree data and the historical usage data.

In some embodiments, the webpage optimization system 102 may provide for receiving webpage node description data comprising a textual description data structure for each webpage node in the first set of webpage nodes. In some embodiments, the webpage optimization system 102 may provide for generating semantic grouping data for the first set of webpage nodes based on the first webpage decision tree data and the webpage node description data. In some embodiments, the webpage optimization system 102 may provide for generating the semantic grouping data based on an unsupervised clustering technique, such as NLP clustering.

In some embodiments, the webpage optimization system 102 may provide for determining a second ANC value based on the first set of webpage nodes. The second ANC value may be less than the first ANC value. In some embodiments, the webpage optimization system 102 may provide for determining the second ANC value based on an ANC optimization technique, such as a naive technique, a greedy technique, an exhaustive search technique, or a combination thereof. In some embodiments, the webpage optimization system 102 may provide for determining a minimum ANC value based on the first set of webpage nodes, where the second ANC value is the minimum ANC value.

In some embodiments, the webpage optimization system 102 may provide for generating, based on the second ANC value and the semantic grouping data, second webpage decision tree data indicative of a second webpage decision tree structure for a second set of webpage nodes. In some embodiments, the webpage optimization system 102 may provide for generating a webpage node included in the second set of webpage nodes by joining two webpage nodes included in the first set of webpage nodes. In some embodiments, the webpage optimization system 102 may provide for generating two webpage nodes included in the second set of webpage nodes by splitting a webpage node included in the first set of webpage nodes. In some embodiments, the webpage optimization system 102 may provide for generating webpage node description data comprising a textual description data structure for each webpage node in the second set of webpage nodes. As used herein, "webpage node" may refer to a webpage node, a webpage leaf, or a root node. For example, the "first set of webpage nodes" may comprise a root node, one or more webpage nodes, one or more webpage leaves, or any combination thereof. Similarly, the "second set of webpage nodes" may comprise a root node, one or more webpage nodes, one or more webpage leaves, or any combination thereof.

In some embodiments, the webpage optimization system 102 may provide for generating DTV data indicative of the first webpage decision tree data, the second webpage decision tree data, or a combination thereof, and transmitting the DTV data to a display device, such as a display device that is associated with or integrated into one or more agent devices 112. In some instances, the DTV data may comprise heatmap visualization data, tree visualization data (e.g., horizontal tree visualization data, vertical tree visualization data), graph visualization data, pie chart visualization data, ring visualization data, word cloud visualization data, bar plot visualization data, bubble chart visualization data, Sankey diagram visualization data, any other suitable visualization data, or any combination thereof.

In some embodiments, the webpage optimization system 102 may provide for generating machine learning prediction data based on the second webpage decision tree data and, in some instances, historical user behavior data received from one or more data storage devices 114. In some embodiments, the webpage optimization system 102 may provide for generating decision tree recommendation data based on the machine learning prediction data.

Example Implementing Apparatus

Figure 2:
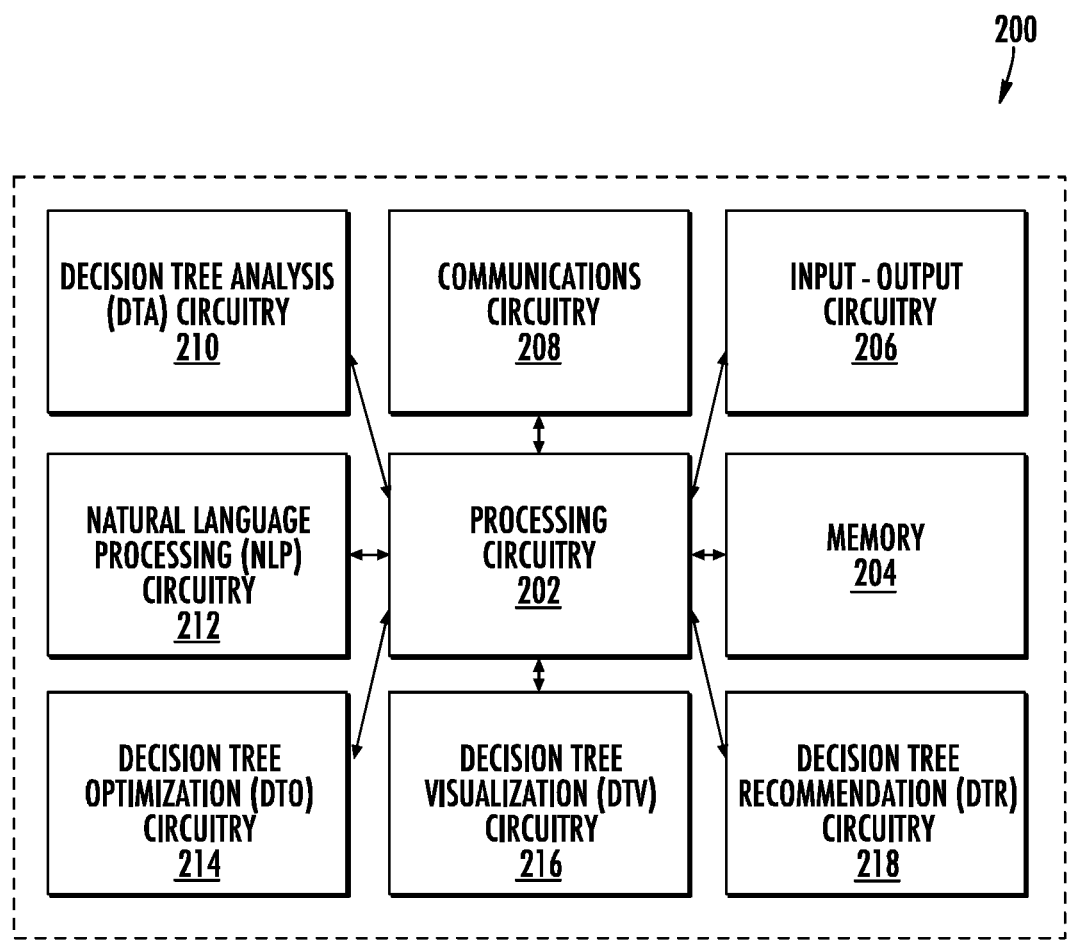
FIG. 2 illustrates an example schematic block diagram 200 in accordance with some example embodiments.

The webpage optimization system 102 described with reference to FIG. 1 may be embodied by one or more computing apparatuses, such as apparatus 200 shown in FIG. 2. As illustrated in FIG. 2, the apparatus 200 may include processing circuitry 202, memory 204, input-output circuitry 206, communications circuitry 208, decision tree analysis (DTA) circuitry 210, natural language processing (NLP) circuitry 212, decision tree optimization (DTO) circuitry 214, decision tree visualization (DTV) circuitry 216, and decision tree recommendation (DTR) circuitry 218. The apparatus 200 may be configured to execute the operations described above with respect to FIG. 1 and below with respect to FIGS. 3-30. Although some of these components 202-218 are described with respect to their functional capabilities, it should be understood that the particular implementations necessarily include the use of particular hardware to implement such functional capabilities. It should also be understood that certain of these components 202-218 may include similar or common hardware. For example, two sets of circuitry may both leverage use of the same processor, network interface, storage medium, or the like to perform their associated functions, such that duplicate hardware is not required for each set of circuitry.

The use of the term "circuitry" as used herein with respect to components of the apparatus 200 therefore includes particular hardware configured to perform the functions associated with respective circuitry described herein. Of course, while the term "circuitry" should be understood broadly to include hardware, in some embodiments, circuitry may also include software for configuring the hardware. For example, in some embodiments, "circuitry" may include processing circuitry, storage media, network interfaces, input-output devices, and other components. In some embodiments, other elements of the apparatus 200 may provide or supplement the functionality of particular circuitry. For example, the processing circuitry 202 may provide processing functionality, memory 204 may provide storage functionality, and communications circuitry 208 may provide network interface functionality, among other features.

In some embodiments, the processing circuitry 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. For example, the memory 204 may be an electronic storage device (e.g., a computer readable storage medium). In another example, the memory 204 may be a non-transitory computer-readable storage medium storing computer-executable program code instructions that, when executed by a computing system, cause the computing system to perform the various operations described herein. The memory 204 may be configured to store information, data, content, applications, instructions (e.g., computer-executable program code instructions), or the like, for enabling the apparatus 200 to carry out various functions in accordance with example embodiments of the present disclosure. For example, the memory 204 may be configured to store webpage decision tree data comprising webpage decision tree structures for sets of webpage nodes; historical usage data comprising HNC values for each webpage node in the sets of webpage nodes, historical logs, historical user behavior data, or a combination thereof; ANC values for sets of webpage nodes; webpage node description data comprising textual description data structures for each webpage node in the sets of webpage nodes; semantic grouping data for the sets of webpage nodes; one or more ANC optimization techniques (e.g., naïve techniques, greedy techniques, exhaustive search techniques); one or more NLP techniques (e.g., semantic grouping techniques, unsupervised clustering techniques); DTV data; machine learning prediction data; decision tree recommendation data; account credentials; device characteristics; any other suitable data or data structures; or any combination or combinations thereof. It will be understood that the memory 204 may be configured to store partially or wholly any electronic information, data, data structures, embodiments, examples, figures, processes, operations, techniques, algorithms, instructions, systems, apparatuses, methods, or computer program products described herein, or any combination thereof.

The processing circuitry 202 may be embodied in a number of different ways and may, for example, include one or more processing devices configured to perform independently. Additionally or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processing circuitry 202. Alternatively or additionally, the processing circuitry 202 may be configured to execute hard-coded functionality. As such, whether configured by hardware or software methods, or by a combination of hardware with software, the processing circuitry 202 may represent an entity (e.g., physically embodied in circuitry) capable of performing operations according to an embodiment of the present disclosure while configured accordingly. As another example, when the processing circuitry 202 is embodied as an executor of program code instructions, the instructions may specifically configure the processor to perform the operations described herein when the instructions are executed.

In some embodiments, the apparatus 200 may include input-output circuitry 206 that may, in turn, be in communication with processing circuitry 202 to provide output to the user and, in some embodiments, to receive input such as a command provided by the user. The input-output circuitry 206 may comprise a user interface, such as a GUI, and may include a display that may include a web user interface, a GUI application, a mobile application, a client device, or any other suitable hardware or software. In some embodiments, the input-output circuitry 206 may also include a keyboard, a mouse, a joystick, a display device, a display screen, a touch screen, touch areas, soft keys, a microphone, a speaker, or other input-output mechanisms. The processing circuitry 202, input-output circuitry 206 (which may utilize the processing circuitry 202), or both may be configured to control one or more functions of one or more user interface elements through computer-executable program code instructions (e.g., software, firmware) stored in a non-transitory computer-readable storage medium (e.g., memory 204). Input-output circuitry 206 is optional and, in some embodiments, the apparatus 200 may not include input-output circuitry. For example, where the apparatus 200 does not interact directly with the user, the apparatus 200 may generate user interface data for display by one or more other devices with which one or more users directly interact and transmit the generated user interface data to one or more of those devices. For example, the apparatus 200, using DTV circuitry 216, may generate DTV data for display by one or more display devices and transmit the generated DTV data to those display devices.

The communications circuitry 208 may be any device or circuitry embodied in either hardware or a combination of hardware and software that is configured to receive or transmit data from or to a network or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted or received by the apparatus 200 using any of a number of Internet, Ethernet, cellular, satellite, or wireless technologies, such as IEEE 802.11, Code Division Multiple Access (CDMA), Global System for Mobiles (GSM), Universal Mobile Telecommunications System (UMTS), Long-Term Evolution (LTE), Bluetooth® v1.0 through v5.0, Bluetooth Low Energy (BLE), infrared wireless (e.g., IrDA), ultra-wideband (UWB), induction wireless transmission, Wi-Fi, near field communications (NFC), Worldwide Interoperability for Microwave Access (WiMAX), radio frequency (RF), RFID, or any other suitable technologies.

The DTA circuitry 210 includes hardware components designed or configured to receive, process, generate, and transmit data, such as first webpage decision tree data, historical usage data, and first ANC values. In some embodiments, the DTA circuitry 210 may be in communication with a computing device (e.g., one or more agent devices 112, and one or more data storage devices 114) and thus configured to receive first webpage decision tree data from the computing device. In some instances, the first webpage decision tree data may comprise a first webpage decision tree structure for a first set of webpage nodes. In some embodiments, the DTA circuitry 210 may be further configured to receive historical usage data from the computing device or from a different computing device. In some instances, the historical usage data may comprise an HNC value for each webpage node in the first set of webpage nodes. In one example, the DTA circuitry 210 may receive the first webpage decision tree data from a first computing device (e.g., an agent device 112) and, in response, obtain the historical usage data from a second computing device (e.g., a data storage device 114). In another example, the DTA circuitry 210 may receive the first webpage decision tree data and the historical usage data from the memory 204. In some embodiments, the DTA circuitry 210 may be configured to determine a first ANC value for the first set of webpage nodes based on the first webpage decision tree data and the historical usage data.

The NLP circuitry 212 includes hardware components designed or configured to receive, process, generate, and transmit data, such as first webpage node description data and semantic grouping data. In some embodiments, the NLP circuitry 212 may be in communication with a computing device (e.g., one or more agent devices 112, and one or more data storage devices 114) and thus configured to receive first webpage node description data from the computing device. In some instances, the first webpage node description data may comprise a textual description data structure for each webpage node in the first set of webpage nodes. In some embodiments, the NLP circuitry 212 may be configured to generate semantic grouping data for the first set of webpage nodes based on the first webpage decision tree data and the first webpage node description data. For example, the NLP circuitry 212 may be configured to generate the semantic grouping data based on an unsupervised clustering technique, such as NLP clustering.

The DTO circuitry 214 includes hardware components designed or configured to receive, process, generate, and transmit data, such as second ANC values, second webpage decision tree data, and second webpage node description data. In some embodiments, the DTO circuitry 214 may be configured to determine a second ANC value based on the first set of webpage nodes. In some instances, the second ANC value may be less than the first ANC value. In some embodiments, the DTO circuitry 214 may be configured to determine the second ANC value based on an ANC optimization technique, such as a naive technique, a greedy technique, an exhaustive search technique, or a combination thereof. In some embodiments, the DTO circuitry 214 may be configured to determine a minimum ANC value based on the first set of webpage nodes, where the second ANC value is the minimum ANC value. In some embodiments, the DTO circuitry 214 may be configured to generate, based on the second ANC value and the semantic grouping data, second webpage decision tree data indicative of a second webpage decision tree structure for a second set of webpage nodes. In some embodiments, the DTO circuitry 214 may be configured to generate a webpage node included in the second set of webpage nodes by joining two webpage nodes included in the first set of webpage nodes. In some embodiments, the DTO circuitry 214 may be configured to generate two webpage nodes included in the second set of webpage nodes by splitting a webpage node included in the first set of webpage nodes. In some embodiments, the DTO circuitry 214 may be configured to generate webpage node description data comprising a textual description data structure for each webpage node in the second set of webpage nodes.

The DTV circuitry 216 includes hardware components designed or configured to receive, process, generate, and transmit data, such as spreadsheets and DTV data. In some embodiments, the DTV circuitry 216 may be configured to generate DTV data indicative of the first webpage decision tree data, the second webpage decision tree data, or a combination thereof. In some embodiments, the generated DTV data may comprise one or more of, or one or more portions of, the first webpage decision tree data, the first webpage decision tree structure, the first set of webpage nodes, the historical usage data, the HNC values, historical logs, historical user behavior data, the first ANC value, the first webpage node description data, the first textual description data structure, the semantic grouping data, the second webpage decision tree data, the second webpage decision tree structure, the second set of webpage nodes, the second ANC value, the second webpage node description data, the second textual description data structure, spreadsheets, machine learning prediction data, decision tree recommendation data, account credentials, device characteristics, any other suitable data or data structures, or any combination or combinations thereof. In some instances, the DTV data may comprise heatmap visualization data, tree visualization data (e.g., horizontal tree visualization data, vertical tree visualization data), graph visualization data, pie chart visualization data, ring visualization data, word cloud visualization data, bar plot visualization data, bubble chart visualization data, Sankey diagram visualization data, any other suitable visualization data, or any combination thereof. For instance, the DTV circuitry 216 includes hardware components designed or configured to generate the DTV data based on any embodiment or combination of embodiments described with reference to FIGS. 1-30.

In some embodiments, the DTV circuitry 216 may be in communication with a display device (e.g., input-output circuitry 206, an agent device 112, or a display device communicatively coupled thereto) and thus configured to transmit the DTV data to the display device. For example, the DTV circuitry 216 may be configured to generate DTV data and transmit the generated DTV data to the input-output circuitry 206, and the input-output circuitry 206 may be configured to receive the DTV data and display the received DTV data on one or more display screens.

The DTR circuitry 218 includes hardware components designed or configured to receive, process, generate, and transmit data, such as second webpage decision tree data, historical user behavior data, machine learning prediction data, and decision tree recommendation data. In some embodiments, the DTV circuitry 216 may be configured to generate machine learning prediction data based on the second webpage decision tree data and, in some instances, historical user behavior data received from a computing device (e.g., one or more data storage devices 114). In some embodiments, the DTV circuitry 216 may be configured to generate decision tree recommendation data based on the machine learning prediction data.

In some embodiments, each of the DTA circuitry 210, NLP circuitry 212, DTO circuitry 214, DTV circuitry 216, and DTR circuitry 218 may include a separate processor, specially configured field programmable gate array (FPGA), application specific interface circuit (ASIC), or cloud utility to perform the above functions. In some embodiments, the hardware components described above with reference to DTA circuitry 210, NLP circuitry 212, DTO circuitry 214, DTV circuitry 216, and DTR circuitry 218, may, for instance, utilize communications circuitry 208 or any suitable wired or wireless communications path to communicate with a user device (e.g., one or more user devices 110), an agent device (e.g., one or more agent devices 112), a data storage device (e.g., one or more data storage devices 114), each other, or any other suitable circuitry or device.

In some embodiments, one or more of the DTA circuitry 210, NLP circuitry 212, DTO circuitry 214, DTV circuitry 216, and DTR circuitry 218 may be hosted locally by the apparatus 200. In some embodiments, one or more of the DTA circuitry 210, NLP circuitry 212, DTO circuitry 214, DTV circuitry 216, and DTR circuitry 218 may be hosted remotely (e.g., by one or more cloud servers) and thus need not physically reside on the apparatus 200. Thus, some or all of the functionality described herein may be provided by a third party circuitry. For example, the apparatus 200 may access one or more third party circuitries via any sort of networked connection that facilitates transmission of data and electronic information between the apparatus 200 and the third party circuitries. In turn, the apparatus 200 may be in remote communication with one or more of the DTA circuitry 210, NLP circuitry 212, DTO circuitry 214, DTV circuitry 216, and DTR circuitry 218.

As described above and as will be appreciated based on this disclosure, embodiments of the present disclosure may be configured as systems, apparatuses, methods, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer program instructions and/or other type of code described herein may be loaded onto a computer, processor or other programmable apparatus's circuitry to produce a machine, such that the computer, processor, or other programmable circuitry that executes the code on the machine creates the means for implementing various functions, including those described herein.

The one or more user devices 110, one or more agent devices 112, and one or more data storage devices 114 may be embodied by one or more computing devices or systems that also may include processing circuitry, memory, input-output circuitry, and communications circuitry. For example, a data storage device 114 may be a database server on which computer code (e.g., C, C++, C#, java, a structured query language (SQL), a data query language (DQL), a data definition language (DDL), a data control language (DCL), a data manipulation language (DML)) is running or otherwise being executed by processing circuitry. In another example, an agent device 112 may be a laptop computer on which an app (e.g., a GUI application) is running or otherwise being executed by processing circuitry. In yet another example, a user device 110 may be a smartphone on which an app (e.g., a webpage browsing app) is running or otherwise being executed by processing circuitry. As it relates to operations described in the present disclosure, the functioning of these devices may utilize components similar to the similarly named components described above with respect to FIG. 2. Additional description of the mechanics of these components is omitted for the sake of brevity. These device elements, operating together, provide the respective computing systems with the functionality necessary to facilitate the communication of data with the webpage optimization system described herein.

Having described specific components of example devices involved in the present disclosure, example procedures for optimizing webpages are described below in connection with FIGS. 3-30.

Figure 3:
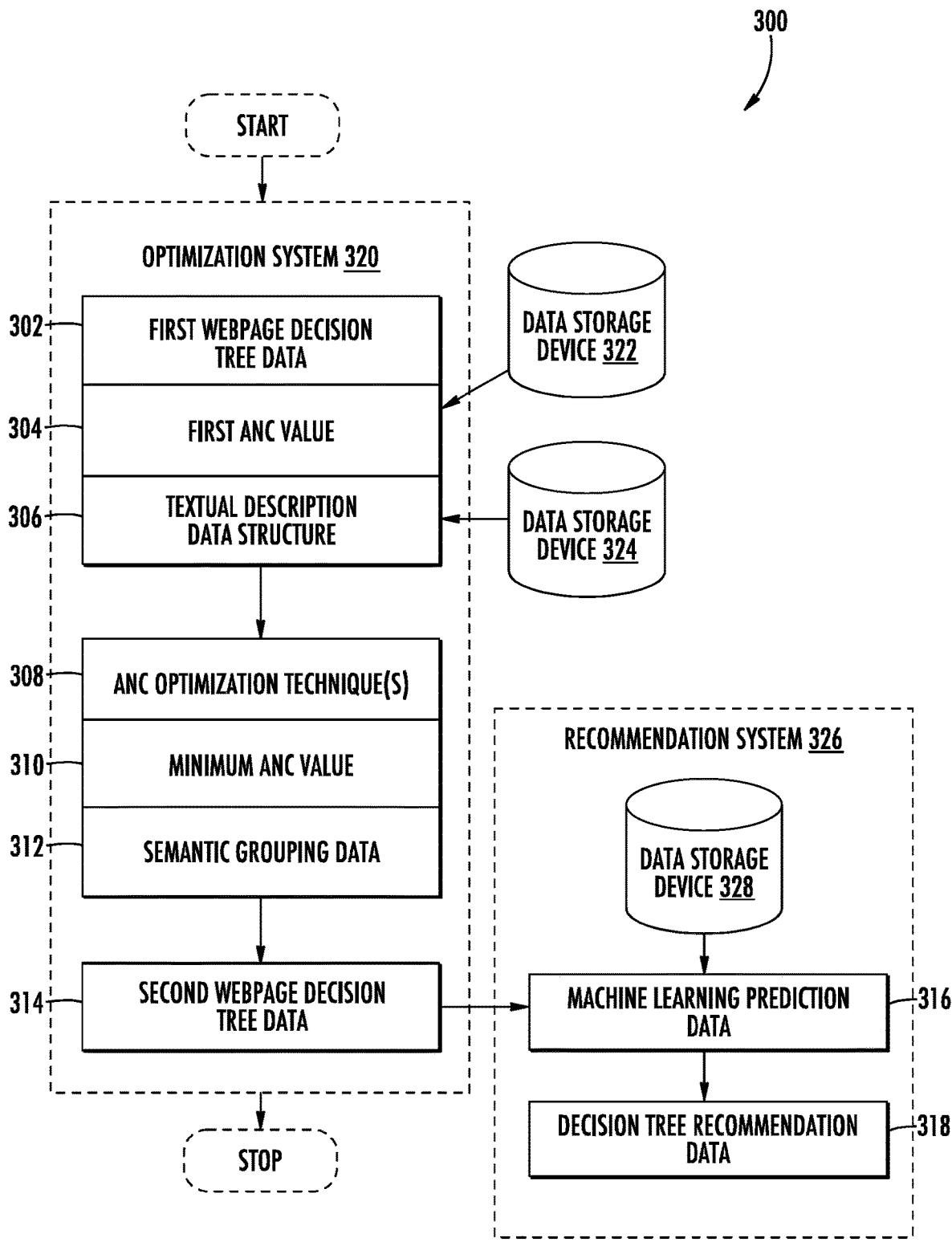
FIG. 3 illustrates an example process diagram 300 in accordance with some example embodiments.

FIG. 3 illustrates an example process diagram 300 for optimizing a webpage decision tree structure in accordance with some example embodiments. As shown in FIG. 3, the example process diagram 300 comprises optimization system 320, data storage device 322, data storage device 324, recommendation system 326, and data storage device 328. In some embodiments, optimization system 320 may be a webpage optimization system comprising DTA, NLP, and DTO functionality. In some embodiments, recommendation system 326 may be a DTR system comprising machine learning functionality. In some embodiments, data storage device 322 may store historical usage data comprising HNC values. In some embodiments, data storage device 324 may store historical usage data comprising historical logs (e.g., text logs). In some embodiments, data storage device 328 may store historical usage data comprising historical user behavior data.

In some embodiments, the optimization system 320 analyzes and optimizes a first webpage decision tree structure (e.g., an un-optimized, pre-optimized, or partially-optimized webpage decision tree structure) and, based on the analysis and optimization, generates a second webpage decision tree structure having a reduced or minimum ANC value. At block 302, the optimization system 320 receives first webpage decision tree data comprising a first webpage decision tree structure for a first set of webpage nodes. At block 304, the optimization system 320 receives HNC values for the first webpage decision tree structure from data storage device 322 and determines an ANC value for the first webpage decision tree structure based on the received HNC values. At block 306, the optimization system 320 receives historical logs (e.g., text logs) from data storage device 324 and generates a textual description data structure for the first webpage decision tree structure based on the received historical logs. At block 308, the optimization system 320 executes one or more ANC optimization techniques to determine a minimum ANC value at block 310. In some embodiments, the optimization system 320 may determine the minimum ANC value based on a naïve technique, one or more greedy techniques, an exhaustive search technique, or a combination thereof. At block 312, the optimization system 320 generates semantic grouping data based on the first webpage decision tree data and the textual description data structure. In some embodiments, the optimization system 320 may generate the semantic grouping data based on an unsupervised clustering technique, such as NLP clustering. At block 314, the optimization system 320 generates, based on the minimum ANC value and the semantic grouping data, second webpage decision tree data indicative of a second webpage decision tree structure for a second set of webpage nodes and transmits the generated second webpage decision tree data to the recommendation system 326.

In some embodiments, the recommendation system 326 generates decision tree recommendation data (e.g., recommendations per single user) for the second webpage decision tree data based on a machine learning prediction technique. At block 316, the recommendation system 326 receives the second webpage decision tree data from the optimization system 320, receives historical user behavior data from the data storage device 328, and generates machine learning prediction data based on the received second webpage decision tree data and the received historical user behavior data. At block 318, the recommendation system 326 generates decision tree recommendation data based on the machine learning prediction data.

In one illustrative example, the recommendation system 326 may extract keywords from the names of categories or from text description related to tree leaves. The recommendation system 326 may generate, based on the extracted keywords, similarities between the categories on different levels of the decision tree using NLP techniques. The recommendation system 326 then may generate, based on the generated similarities, new similar groups or categories. Additionally, the recommendation system 326 may label the generated new categories through the use of expert knowledge depending, in some instances, on the specific theme which is generalized by an example aggregation approach, such as the example aggregation approach illustrated in FIG. 31.

Figure 31:
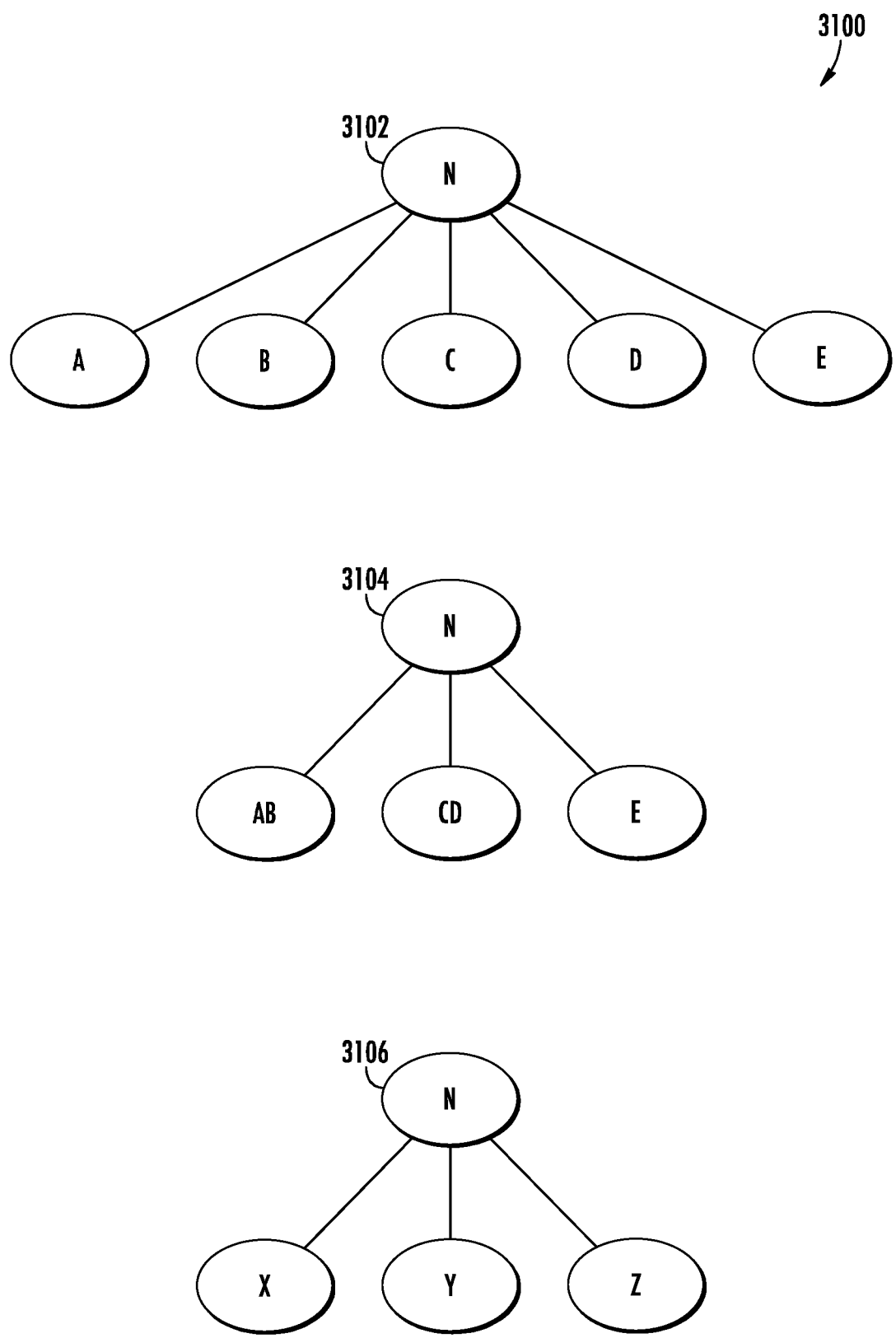
FIG. 31 illustrates example data 3100 in accordance with some embodiments.

FIG. 31 illustrates example data 3100 for use in unsupervised text clustering. The letter "N" refers to the number of new categories. For example, N=3 in FIG. 31. In some embodiments, the recommendation system 326 may cluster and label a decision tree using an example workflow where: (i) decision tree 3102 represents a decision tree before clustering (e.g., comprising categories A, B, C, D, E); (ii) decision tree 3104 represents the decision tree after clustering (e.g., categories A, B, C, D, E may be grouped as new categories AB, CD, E); and (iii) decision tree 3106 represents the decision tree after labeling (e.g., groups are named with the new more precise and meaningful names {X, Y, Z}, where AB=X, CD=Y, and E=Z). The recommendation system 326 may generate groupings of categories by applying similarities between the semantic meaning of categories descriptions. The core meaning of the words may be represented by digitization words and sentences. Subsequently, the recommendation system 326 may cluster nodes based on a combination of heuristic, NLP, and machine learning techniques. In some instances, new groups or categories may provide consistency in the context of the descriptive similarity. As a result, the recommendation system 326 may discover similar descriptions and create a more semantically transparent structure for the decision tree. In some instances, the labeling of the new groups may require expert intervention, wherein the recommendation system 326 receives user labeling input provided by a user using a user device and then labels the new groups based on the received user labeling input. In some instances, newly created groups may include nodes from different parts of the old decision tree structures.

In some embodiments, the webpage optimization system disclosed herein may implement blocks 302, 304, 306, 308, 310, 312, and 314 in an application, such as a desktop GUI application. In some embodiments, the webpage optimization system disclosed herein may perform historical optimization at blocks 304 and 310. In some embodiments, the webpage optimization system disclosed herein may perform semantical optimization at blocks 306 and 312. In some embodiments, the webpage optimization system disclosed herein may generate, at block 314, more optimal webpage decision tree structures that simplify the navigation and searching of content and, in some instances, are more intuitive for users than traditional structures. In some embodiments, the webpage optimization system disclosed herein may improve the accuracy of machine learning prediction techniques at block 316 and the precision of recommendations (e.g., per single user) at block 318 based on these optimal webpage decision tree structures.

Figure 4:
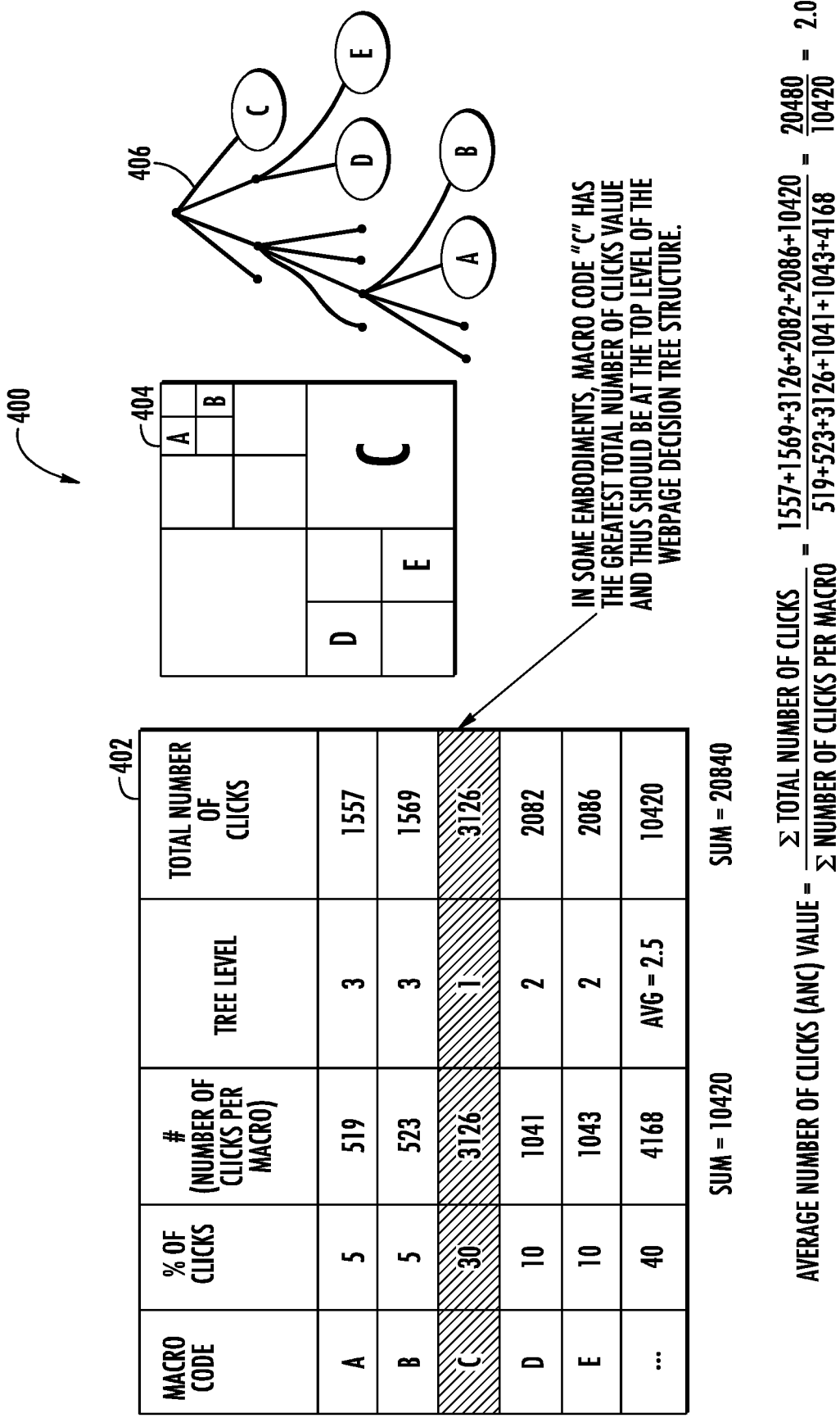
FIG. 4 illustrates example data 400 comprising an example average number of clicks (ANC) value for a set of webpage nodes in accordance with some example embodiments.

FIG. 4 illustrates example data 400 comprising an example ANC value for a set of webpage nodes (e.g., macro codes) in accordance with some example embodiments. As shown in FIG. 4, example data 400 comprises table 402, map 404 (e.g., a treemap or heatmap), and tree 406 (e.g., a vertical tree). In some embodiments, the webpage optimization system described herein may determine an ANC value by dividing the sum of the total number of clicks by the sum of the number of clicks per webpage node. For example, as further shown in FIG. 4, the ANC value for the set of webpage nodes included in table 402 (e.g., webpage nodes A, B, C, D, E, and the remainder of webpage nodes as denoted by " . . . ") is 2.0. In some embodiments, webpage node C has the greatest total number of clicks (e.g., 3126) and thus should be at the top level or category of the webpage decision tree structure.

Figure 5:
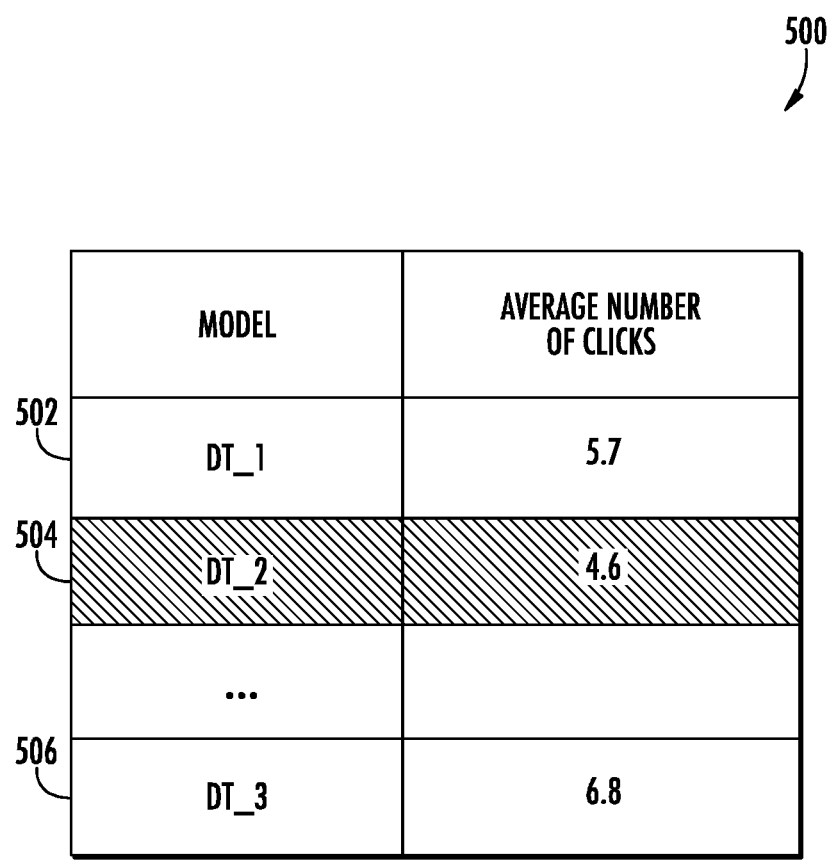
FIG. 5 illustrates example data 500 comprising example ANC values for a plurality of ANC optimization techniques in accordance with some example embodiments.

FIG. 5 illustrates example data 500 comprising example ANC values for a plurality of ANC optimization techniques in accordance with some example embodiments. The webpage optimization system described herein may perform the operations described herein with reference to FIG. 5 to measure and compare Decision Tree (DT) Models (e.g., proposed webpage decision tree structures) and ANC optimization techniques. For example, the webpage optimization system may generate an ANC value for each simulated DT model based on historical statistics, such as the percentage and number of chosen macros. In some embodiments, the webpage optimization system may determine each ANC value according to equation 1 below:

$$ANC = \frac{\sum_{i=1}^{N} D_i * HistClicks}{NClicks} \quad (1)$$

where N is the number of webpage leaves in the Decision Tree; $D_i$ is the Tree Level with Macro Code; HistClicks is the number of clicks per Macro; NClicks is the total number of chosen Macros; and i is an integer ranging from 1 to N, where N is an integer that is greater than or equal to 1.

As shown in FIG. 5, the webpage optimization system described herein may generate an ANC value of 5.7 based on ANC optimization technique 502 (e.g., "DT_1"). The webpage optimization system may generate an ANC value of 4.6 based on ANC optimization technique 504 (e.g., "DT_2"). The webpage optimization system may generate an ANC value of 6.8 based on ANC optimization technique 506 (e.g., "DT_3"). In some embodiments, the webpage optimization system may select the minimum ANC value (e.g., 4.6) as the "second ANC value" described herein. Accordingly, in some instances, the webpage optimization system may select ANC optimization technique 506 (e.g., "DT_2") as the optimal or preferred ANC optimization technique for optimizing the particular webpage decision tree structure associated with example data 500.

Figure 6:
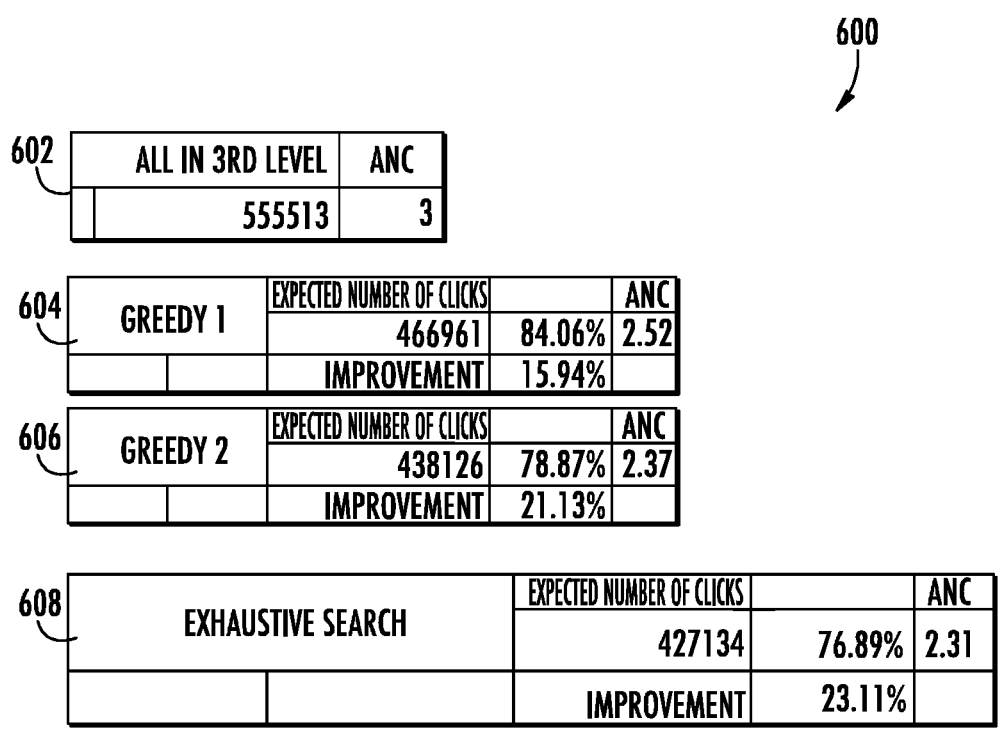
FIG. 6 illustrates example data 600 comprising example ANC values for a plurality of ANC optimization techniques in accordance with some example embodiments.

FIG. 6 illustrates example data 600 comprising example ANC values for a plurality of ANC optimization techniques in accordance with some example embodiments. As shown in FIG. 6, the webpage optimization system described herein may generate an ANC value of 3.0 based on ANC optimization technique 602 (e.g., a naïve technique). The webpage optimization system may generate an ANC value of 2.52 based on ANC optimization technique 604 (e.g., a greedy technique at a first level). The webpage optimization system may generate an ANC value of 2.37 based on ANC optimization technique 606 (e.g., a greedy technique at a second level). The webpage optimization system may generate an ANC value of 2.31 based on ANC optimization technique 608 (e.g., an exhaustive search technique). In some embodiments, the webpage optimization system may select the minimum ANC value (e.g., 2.31) as the "second ANC value" described herein. Accordingly, in some instances, the webpage optimization system may select ANC optimization technique 608 (e.g., the exhaustive search technique) as the optimal or preferred ANC optimization technique for optimizing the particular webpage decision tree structure associated with example data 600.

FIG. 7 illustrates example data 700 comprising example ANC values for a plurality of ANC optimization techniques in accordance with some example embodiments. As shown in statistics 702, the webpage optimization system described herein may generate an ANC value of 4.0 based on a naïve technique having a tree depth of 4. The webpage optimization system may generate an ANC value of 3.19 based on ANC optimization technique 704 (e.g., a greedy technique at a first level). The webpage optimization system may generate an ANC value of 2.73 based on ANC optimization technique 706 (e.g., a greedy technique at a second level). The webpage optimization system may generate an ANC value of 3.03 based on ANC optimization technique 708 (e.g., a greedy technique at a third level). In some embodiments, the webpage optimization system may select the minimum ANC value (e.g., 2.73) as the "second ANC value" described herein. Accordingly, in some instances, the webpage optimization system may select ANC optimization technique 706 (e.g., the greedy technique at the second level) as the optimal or preferred ANC optimization technique for optimizing the particular webpage decision tree structure associated with example data 700.

Figure 8:
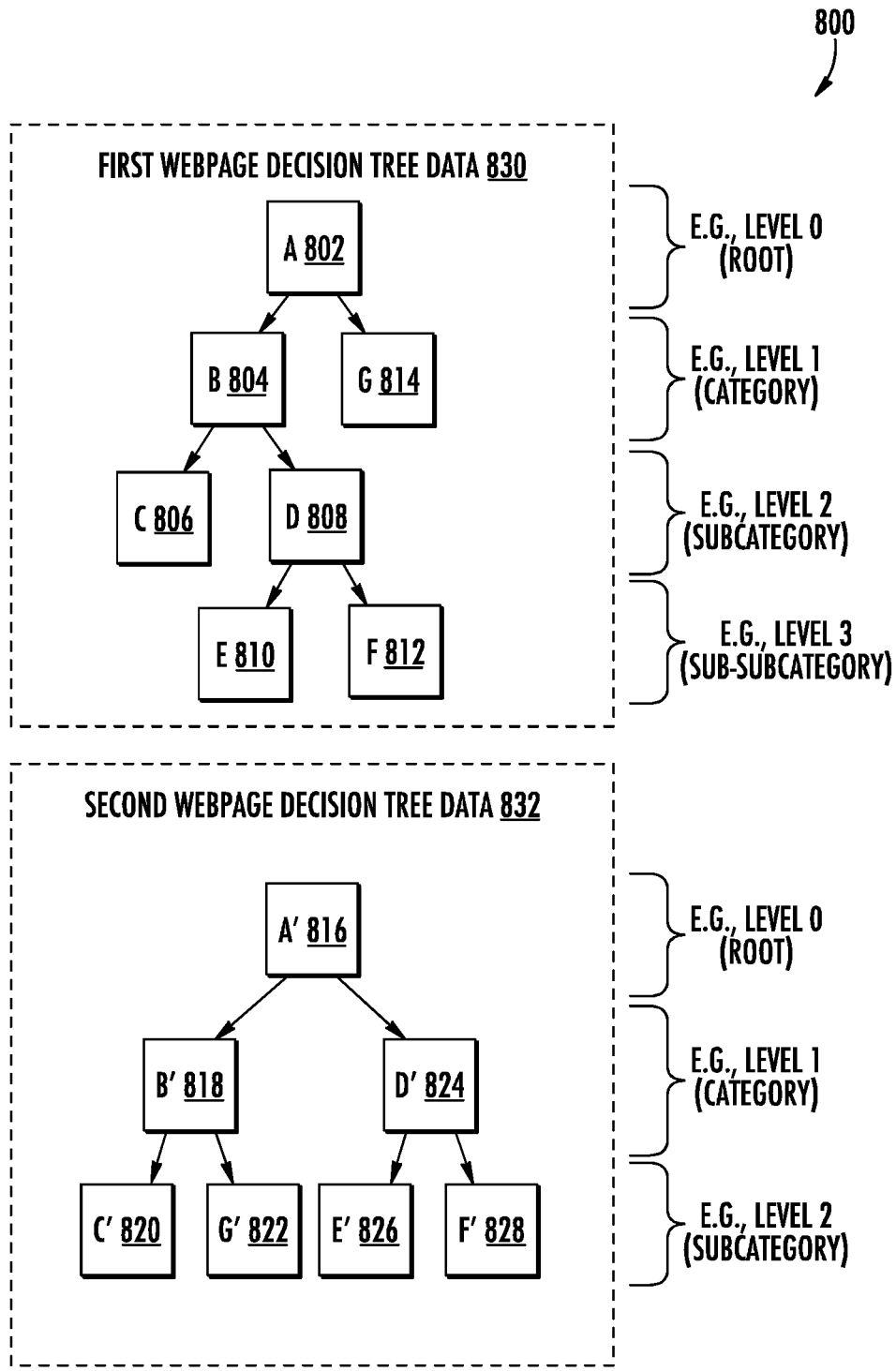
FIG. 8 illustrates example data 800 comprising example first webpage decision tree data and example second webpage decision tree data in accordance with some example embodiments.

FIG. 8 illustrates example data 800 comprising example first webpage decision tree data 830 and example second webpage decision tree data 832 in accordance with some example embodiments. As shown in FIG. 8, example first webpage decision tree data 830 comprises a first webpage decision tree structure for a first set of webpage nodes comprising webpage node 802 (e.g., "A"), webpage node 804 (e.g., "B"), webpage node 806 (e.g., "C"), webpage node 808 (e.g., "D"), webpage node 810 (e.g., "E"), webpage node 812 (e.g., "F"), and webpage node 814 (e.g., "G"). webpage node 802 is at level 0 (e.g., a "root" level). webpage nodes 804 and 814 are at level 1 (e.g., a "category" level). webpage nodes 806 and 808 are at level 2 (e.g., a "subcategory" level). webpage nodes 810 and 812 are at level 3 (e.g., a "subsubcategory" level). In some embodiments, each of webpage nodes 806, 810, 812, and 814 may be referred to as a webpage "leaf."

As further shown in FIG. 8, example second webpage decision tree data 832 comprises a second webpage decision tree structure for a second set of webpage nodes comprising webpage node 816 (e.g., "A"), webpage node 818 (e.g., "B"), webpage node 820 (e.g., "C"), webpage node 822 (e.g., "G"), webpage node 824 (e.g., "D"), webpage node 826 (e.g., "E"), and webpage node 828 (e.g., "F"). webpage node 816 is at level 0 (e.g., a "root" level). webpage nodes 818 and 824 are at level 1 (e.g., a "category" level). webpage nodes 820, 822, 826, and 828 are at level 2 (e.g., a "subcategory" level). In some embodiments, each of webpage nodes 820, 822, 826, and 828 may be referred to as a webpage "leaf."

In some embodiments, as shown in FIG. 8, the webpage optimization system described herein may receive first webpage decision tree data 830 comprising webpage node 808 (e.g., "D") at level 2 (e.g., the "subcategory" level) and webpage node 814 (e.g., "G") at level 1 (e.g., the "category" level). The webpage optimization system may generate second webpage decision tree data 832 by moving the webpage node 808 (e.g., "D") up to level 1 (e.g., the "category" level) under webpage node 802 (e.g., "A") and further moving webpage node 814 (e.g., "G") down to level 2 (e.g., the "subcategory" level) under webpage node 804 (e.g., "B"). Accordingly, second webpage decision tree data 832 comprises the webpage node 824 (e.g., "D") at level 1 (e.g., the "category" level) under webpage node 816 (e.g., "A") and webpage node 822 (e.g., "G") at level 2 (e.g., the "subcategory" level) under webpage node 818 (e.g., "B'").

In some embodiments, the webpage optimization system described herein may apply heuristic rules to a webpage decision tree structure such that the higher number of splits are at or near the top level of the webpage decision tree structure. In one illustrative example, webpage node 806 may be a webpage leaf having an HNC value of 5 clicks; webpage node 810 may be a webpage leaf having an HNC value of 50 clicks; webpage node 812 may be a webpage leaf having an HNC value of 40 clicks; and webpage node 814 may be a webpage leaf having an HNC value of 12 clicks. Accordingly, first webpage decision tree data 830 may comprise a heavy sub-tree (e.g., in case of the number of clicks) that comprises webpage node 810 (e.g., a first webpage leaf) and webpage node 812 (e.g., a second webpage leaf). As shown in FIG. 8, the webpage optimization system may rearrange the decision tree structure while maintaining consistency within subcategories such that the heavy sub-tree is at or near the top level of the webpage decision tree structure.

Figure 9:
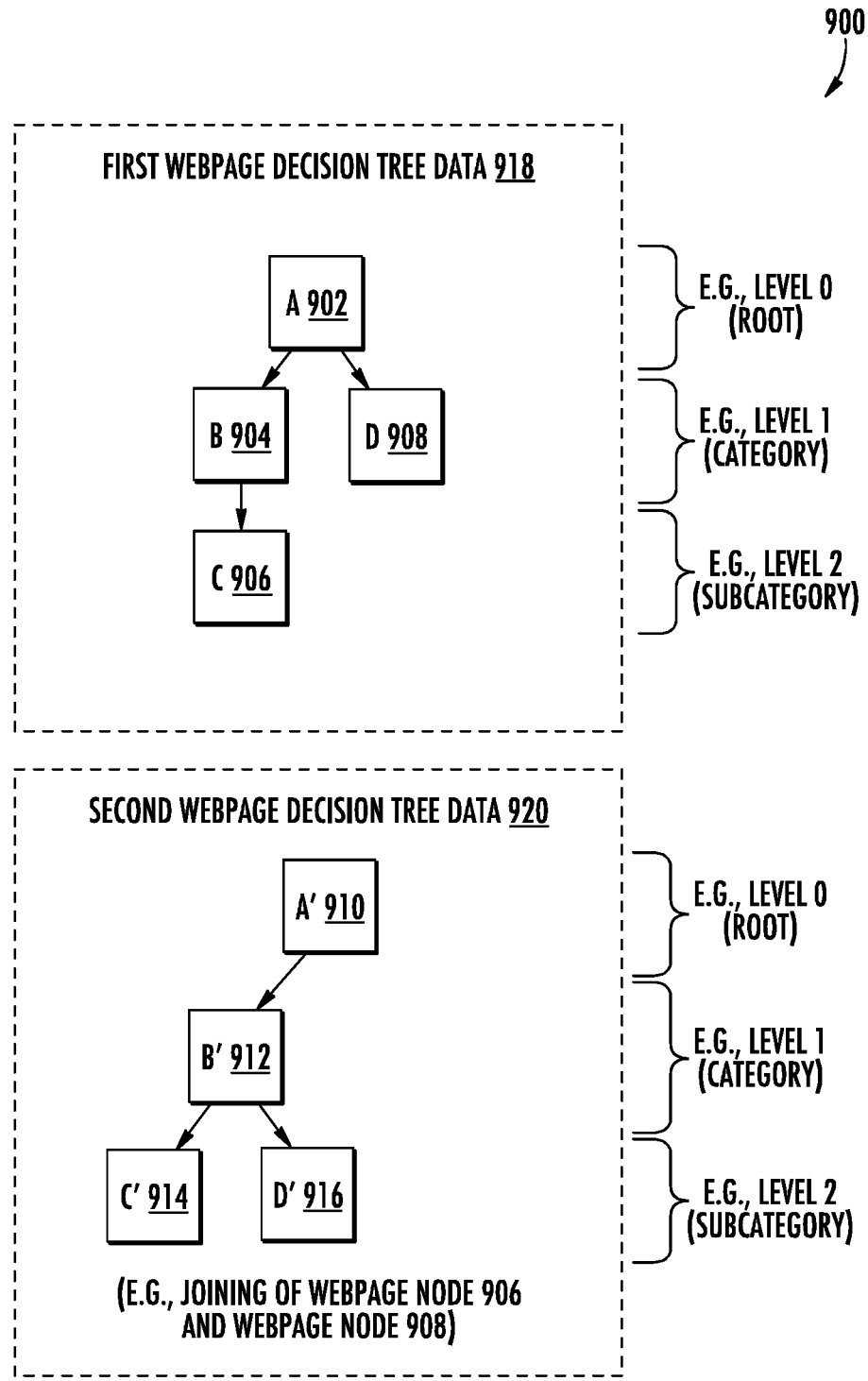
FIG. 9 illustrates example data 900 showing a joining of two webpage nodes in accordance with some example embodiments.

FIG. 9 illustrates example data 900 showing a joining of two webpage nodes in accordance with some example embodiments. As shown in FIG. 9, example first webpage decision tree data 918 comprises a first webpage decision tree structure for a first set of webpage nodes comprising webpage node 902 (e.g., "A"), webpage node 904 (e.g., "B"), webpage node 906 (e.g., "C"), and webpage node 908 (e.g., "D"). webpage node 902 is at level 0 (e.g., a "root" level). webpage nodes 904 and 908 are at level 1 (e.g., a "category" level). webpage node 906 is at level 2 (e.g., a "subcategory" level). In some embodiments, each of webpage nodes 906 and 908 may be referred to as a webpage "leaf."

As further shown in FIG. 9, example second webpage decision tree data 920 comprises a second webpage decision tree structure for a second set of webpage nodes comprising webpage node 910 (e.g., "A"), webpage node 912 (e.g., "B"), webpage node 914 (e.g., "C"), and webpage node 916 (e.g., "D"). webpage node 910 is at level 0 (e.g., a "root" level). webpage node 912 is at level 1 (e.g., a "category" level). webpage nodes 914 and 916 are at level 2 (e.g., a "subcategory" level). In some embodiments, each of webpage nodes 914 and 916 may be referred to as a webpage "leaf."

In some embodiments, as shown in FIG. 9, the webpage optimization system described herein may receive first webpage decision tree data 918 comprising a first webpage node 904 associated with a first category (e.g., category "B" at level 1) of the first webpage decision tree data 918 and a second webpage node 908 associated with a second category (e.g., category "D" at level 1) of the first webpage decision tree data 918. The webpage optimization system may generate, based on a joining of the first webpage node 904 and the second webpage node 908, a third webpage node 912 associated with a third category (e.g., category "B" at level 1) of the second webpage decision tree data 920. In other words, the webpage optimization system may generate the second webpage decision tree data 920 by moving the webpage node 908 (e.g., "D") down to level 2 (e.g., the "subcategory" level) under webpage node 904 (e.g., "B"). Accordingly, the second webpage decision tree data 920 comprises the webpage node 916 (e.g., "D") at level 2 (e.g., the "subcategory" level) under webpage node 912 (e.g., "B").

Figure 10:
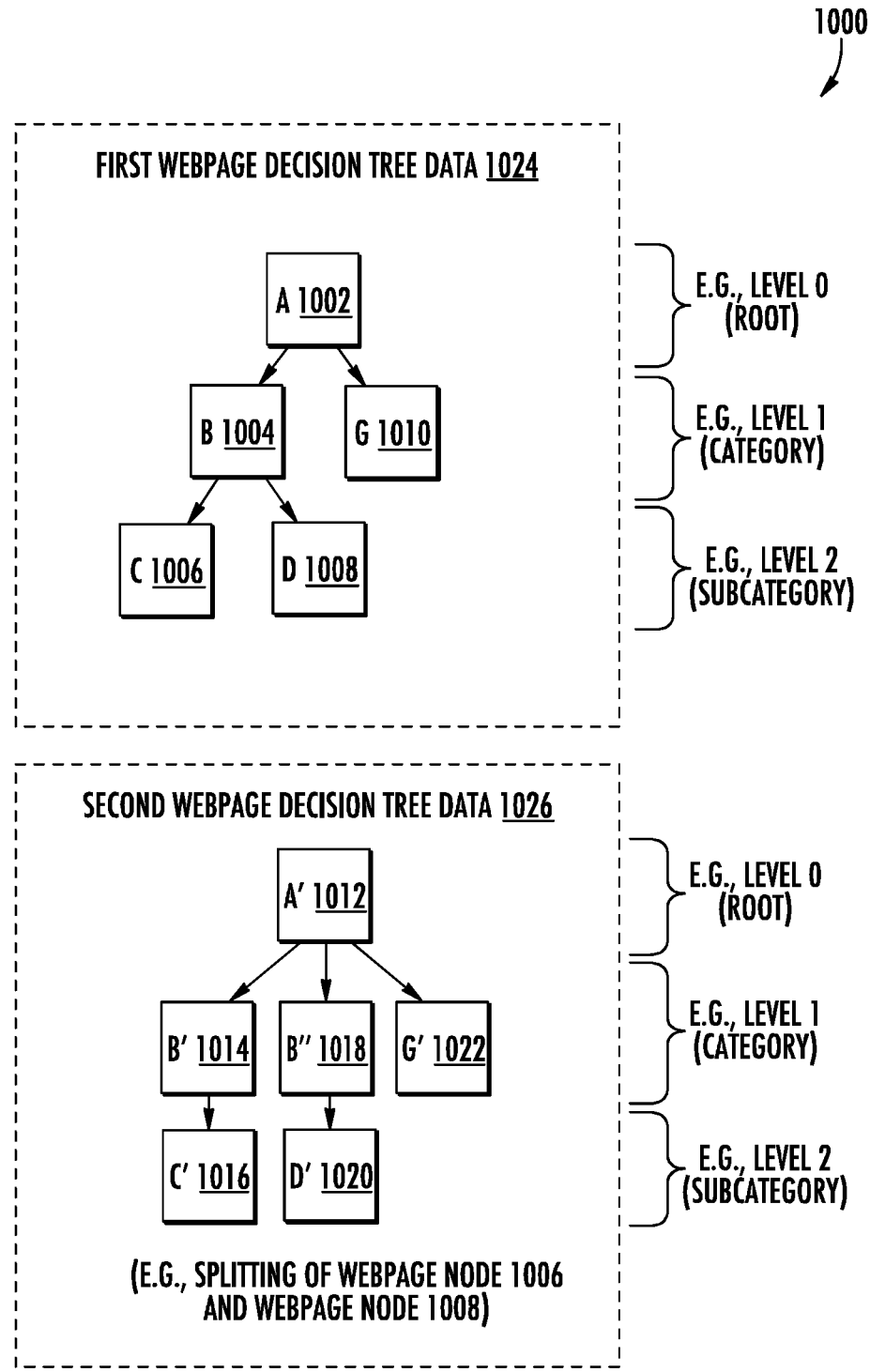
FIG. 10 illustrates example data 1000 showing a splitting of a webpage node in accordance with some example embodiments.

FIG. 10 illustrates example data 1000 showing a splitting of a webpage node in accordance with some example embodiments. As shown in FIG. 10, example first webpage decision tree data 1024 comprises a first webpage decision tree structure for a first set of webpage nodes comprising webpage node 1002 (e.g., "A"), webpage node 1004 (e.g., "B"), webpage node 1006 (e.g., "C"), webpage node 1008 (e.g., "D"), and webpage node 1010 (e.g., "G"). webpage node 1002 is at level 0 (e.g., a "root" level). webpage nodes 1004 and 1010 are at level 1 (e.g., a "category" level). webpage nodes 1006 and 1008 are at level 2 (e.g., a "subcategory" level). In some embodiments, each of webpage nodes 1006, 1008, and 1010 may be referred to as a webpage "leaf."

As further shown in FIG. 10, example second webpage decision tree data 1026 comprises a second webpage decision tree structure for a second set of webpage nodes comprising webpage node 1012 (e.g., "A'"), webpage node 1014 (e.g., "B'"), webpage node 1016 (e.g., "C'"), webpage node 1018 (e.g., "B''"), webpage node 1020 (e.g., "D'"), and webpage node 1022 (e.g., "G'"). webpage node 1012 is at level 0 (e.g., a "root" level). webpage nodes 1014, 1018, and 1022 are at level 1 (e.g., a "category" level). webpage nodes 1016 and 1020 are at level 2 (e.g., a "subcategory" level). In some embodiments, each of webpage nodes 1016, 1020, and 1022 may be referred to as a webpage "leaf."

In some embodiments, as shown in FIG. 10, the webpage optimization system described herein may receive first webpage decision tree data 1024 comprising a first webpage node 1006 associated with a first category (e.g., category "B" at level 1) of the first webpage decision tree data 1024 and a second webpage node 1008 also associated with the first category of the first webpage decision tree data 1024. The webpage optimization system may generate, based on a splitting of the first webpage node 1006 and the second webpage node 1008, a third webpage node 1016 associated with a second category (e.g., category "B" at level 1) of the second webpage decision tree data 1026. The webpage optimization system may further generate, based on the splitting of the first webpage node 1006 and the second webpage node 1008, a fourth webpage node 1020 associated with a third category (e.g., category "B''" at level 1) of the second webpage decision tree data 1026. In other words, the webpage optimization system may generate the second webpage decision tree data 1026 by moving the webpage node 1008 (e.g., "D") under a newly generated webpage node at level 1 (e.g., the "category" level). Accordingly, the second webpage decision tree data 1026 comprises the webpage node 1020 (e.g., "D'") at level 2 (e.g., the "subcategory" level) under the newly generated webpage node 1018 (e.g., "B''''") at level 1 (e.g., the "category" level).

Figure 11:
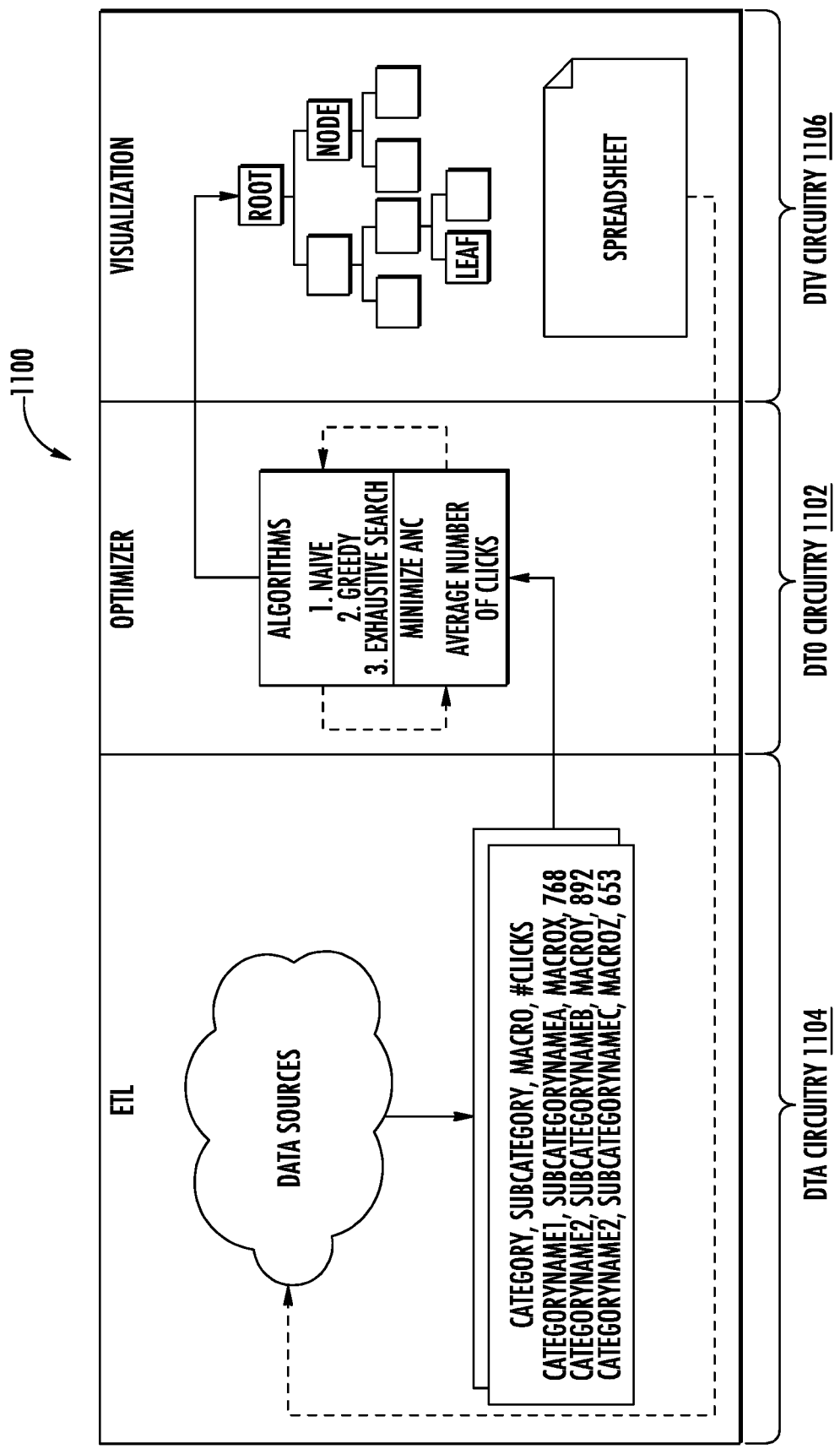
FIG. 11 illustrates an example architecture diagram 1100 for optimizing webpages based in part on ANC optimization techniques in accordance with some example embodiments.

FIG. 11 illustrates an example architecture diagram 1100 for optimizing webpages based in part on ANC optimization techniques in accordance with some example embodiments. In some embodiments, example architecture diagram 1100 provides an architecture overview of an example three-stage process for performing decision tree optimization based on minimization of the historical number of clicks. As shown in FIG. 11, DTA circuitry 1104 performs extract, transform, and load (ETL) operations by extracting data from one or more data sources (e.g., a data warehouse, one or more data storage devices) comprising information about number of clicks for each webpage leaf (e.g. macro chosen by an agent using an agent device). DTO circuitry 1102 compares different ANC optimization techniques based on proposed ANC values. In some instances, DTO circuitry 1102 generates different decision tree structures based on heuristic rule set. DTO circuitry 1102 achieves an improvement in effectiveness by minimizing the number of clicks by twenty percent for the greedy technique, which generally is faster, and thirty percent for the exhaustive search technique, which generally is more precise. DTV circuitry 1106 generates a desktop application (e.g., a "decision tree virtualizer" GUI application) comprising DTV data that displays decision tree structures before and after optimization as well as the ANC values associated therewith. In some instances, DTV circuitry 1106 further generates a spreadsheet based on the optimal webpage decision tree structure. In some instances, the dashed line shown in FIG. 11 that extends from the spreadsheet to the ETL operations refers to further improvement, such as reorganization of data schemas, performed by the webpage optimization system described herein. In some instances, the dashed line shown in FIG. 11 in the optimizer operations refers to iteration performed by the DTO circuitry 1102 using an iterative technique.

In some embodiments, DTO circuitry 1102 may determine a plurality of ANC values based on equation 2 below:

$$ANC_{DT_j} = \frac{\sum_{i=1}^{N} L * C}{N} \quad (2)$$

where $ANC_{DT_j}$ is a value that describes potential minimization of the number of clicks on historical data in specific time period (e.g., one or more seconds, minutes, days, weeks, months, quarters, years, or a combination thereof); L is the Tree Depth (e.g., the number of edges from root webpage node to the webpage leaves) and is interpreted as a number of clicks completed by a user using a user device; C is a historical number of clicks in searched content; N is the Total Number of Clicks in a predefined time window; and $DT_j$ is the j-th Decision Tree Structure; i is an integer value associated with the Tree Depth and ranging from 1 to N, where N is an integer value greater than or equal to 1; and j is an integer value associated with the Decision Tree Structure and ranging from 1 to M, where M is an integer value greater than or equal to 1. For example, DTO circuitry 1102 may determine ANC values for M Decision Tree Structures and select the Decision Tree Structure having the minimum ANC value as the optimal Decision Tree Structure.

Figure 12:
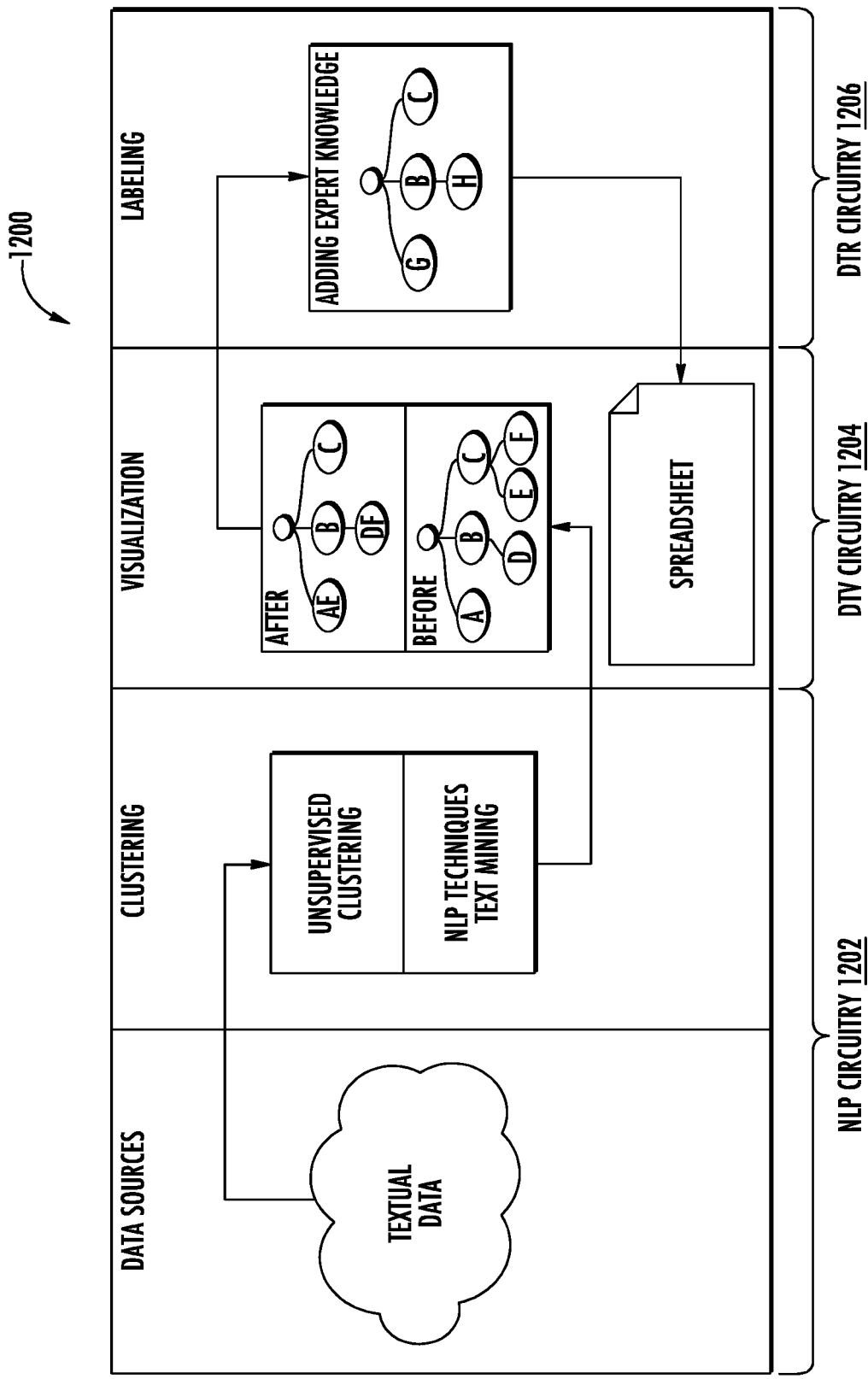
FIG. 12 illustrates an example architecture diagram 1200 for optimizing webpages based in part on NLP techniques in accordance with some example embodiments.

FIG. 12 illustrates an example architecture diagram 1200 for optimizing webpages based in part on NLP techniques in accordance with some example embodiments. In some embodiments, example architecture diagram 1200 provides an architecture overview of an example four-stage process for performing unsupervised clustering. As shown in FIG. 12, NLP circuitry 1202 receives text logs from one or more data sources (e.g., data storage devices) and performs NLP text mining on the received text logs. NLP circuitry 1202 further performs unsupervised clustering techniques to generate semantic grouping data. The unsupervised clustering techniques may include, but are not limited to, k-means clustering techniques, hierarchical clustering techniques, Gaussian mixture models, other suitable unsupervised clustering techniques, and combinations thereof. DTV circuitry 1204 generates a desktop application (e.g., a "decision tree virtualizer" GUI application) comprising DTV data that displays semantic grouping data. In some instances, DTV circuitry 1204 further generates a spreadsheet based on the semantic grouping data. DTR circuitry 1206 receives and processes feedback and labeling from one or more agents using one or more agent devices. In some instances, the number of classes is predefined. In some instances, the webpage optimization system described herein generates semantical consistency by grouping (e.g., RC1, RC2, RC3, RC4, and the like) according to NLP techniques.

Figure 13:
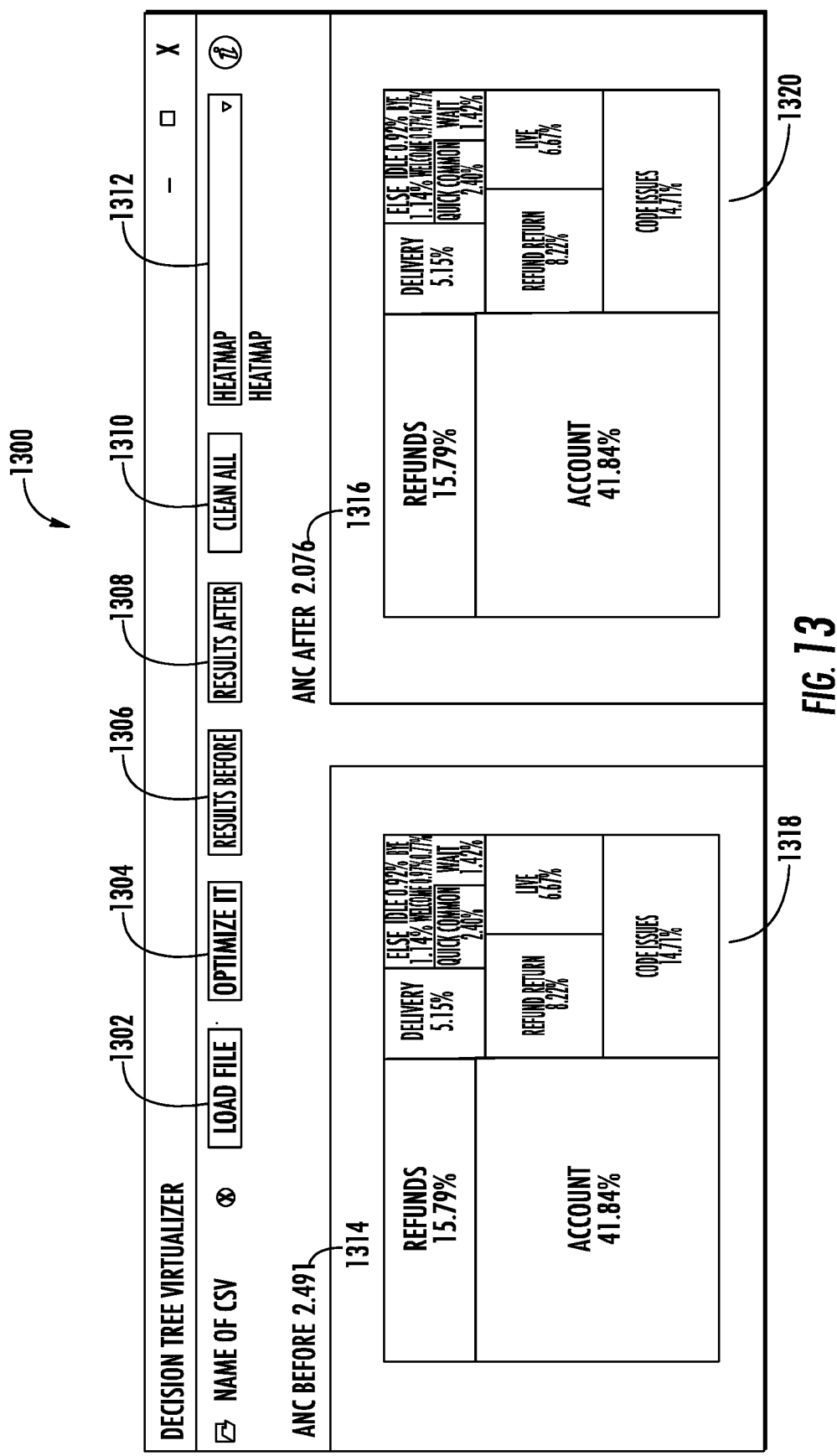
FIG. 13 illustrates an example display screen 1300 comprising various decision tree visualization (DTV) data in accordance with some example embodiments.

FIG. 13 illustrates an example display screen 1300 comprising various DTV data in accordance with some example embodiments. In some embodiments, example display screen 1300 provides a display for a standalone desktop GUI application (e.g., "DECISION TREE VIRTUALIZER") that provides visualization of webpage decision tree structures before and after optimization with implemented optimization algorithms. As shown in FIG. 13, example display screen 1300 comprises selectable icon 1302 (e.g., "Load File"), selectable icon 1304 (e.g., "Optimize it!"), selectable icon 1306 (e.g., "Results before"), selectable icon 1308 (e.g., "Results after"), selectable icon 1310 (e.g., "Clean all"), selectable drop down menu icon 1312 (e.g., "Heat-Map"), first ANC value 1314 (e.g., "2.491"), second ANC value 1316 (e.g., "2.076"), first heatmap visualization data 1318, and second heatmap visualization data 1320.

In some embodiments, the example display screen 1300 may allow an agent using an agent device to load the webpage decision tree structure before optimization in CSV data file format, spreadsheet format, or any other suitable format (e.g., by using an agent device to click selectable icon 1302 and select the appropriate file). In some embodiments, the example display screen 1300 may allow an agent using an agent device to export the webpage decision tree structure before optimization in CSV data file format, spreadsheet format, or any other suitable format (e.g., by using an agent device to select selectable icon 1306). In some embodiments, the example display screen 1300 may allow an agent using an agent device to export the webpage decision tree structure after optimization in CSV data file format, spreadsheet format, or any other suitable format (e.g., by using an agent device to select selectable icon 1308). In some embodiments, the example display screen 1300 may allow an agent using an agent device to perform optimization by minimizing the ANC value, performing unsupervised NLP clustering based on textual data (e.g., logs, emails, chats, and the like), or both (e.g., by using an agent device to select selectable icon 1304). In some embodiments, the example display screen 1300 may allow an agent using an agent device to visualize results before optimization (e.g., components 1314 and 1318) and results after optimization (e.g., components 1316 and 1320) in one of a plurality of different visualization types (e.g., heatmap, horizontal tree, vertical tree, graph, pie chart, ring, word cloud, bar plot, bubble chart, Sankey diagram) by selecting that visualization type from a drop down menu (e.g., by using an agent device to manipulate selectable drop down menu icon 1312). In some embodiments, the example display screen 1300 may allow an agent using an agent device to delete some or all of the DTV data (e.g., by using an agent device to select selectable icon 1310).

FIG. 14 illustrates an example comma separated value (CSV) data file 1400 in accordance with some example embodiments. The example CSV data file 1400 may be a CSV data file (e.g., "dt_before.csv") comprising the webpage decision tree structure before optimization (e.g., based on the first webpage decision tree data).

Figure 15:
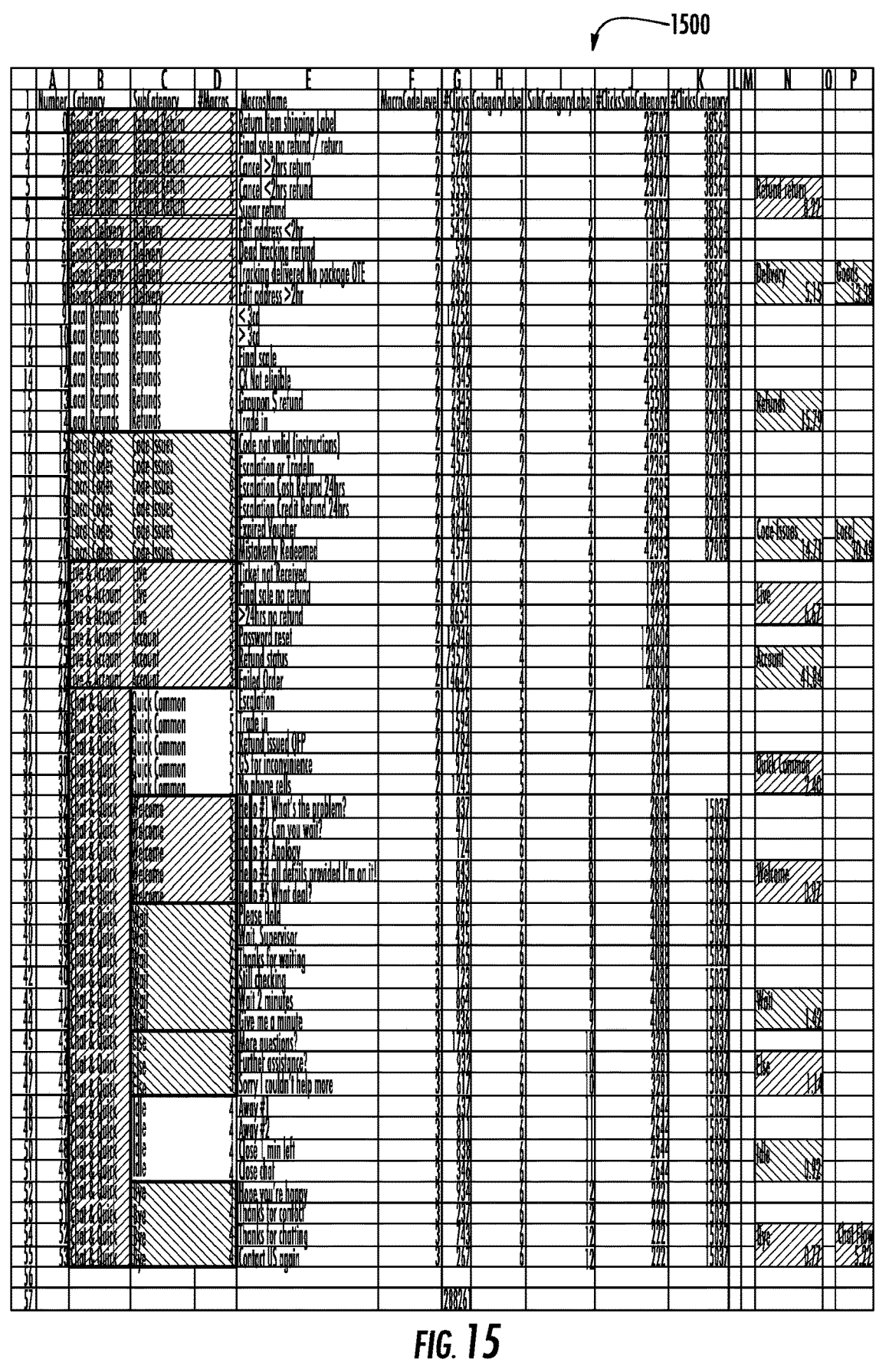

FIG. 15 illustrates an example spreadsheet 1500 in accordance with some example embodiments. The example spreadsheet 1500 may be a spreadsheet (e.g., "dt_formulas_crosscheck_after.xlsx") comprising the webpage decision tree structure after optimization (e.g., based on the second webpage decision tree data); metrics (e.g., ANC values); statistical data; text comments; highlighting, coloring, and/or grouping of spreadsheet cells; any other suitable information or data; and any combination thereof.

Figure 16:
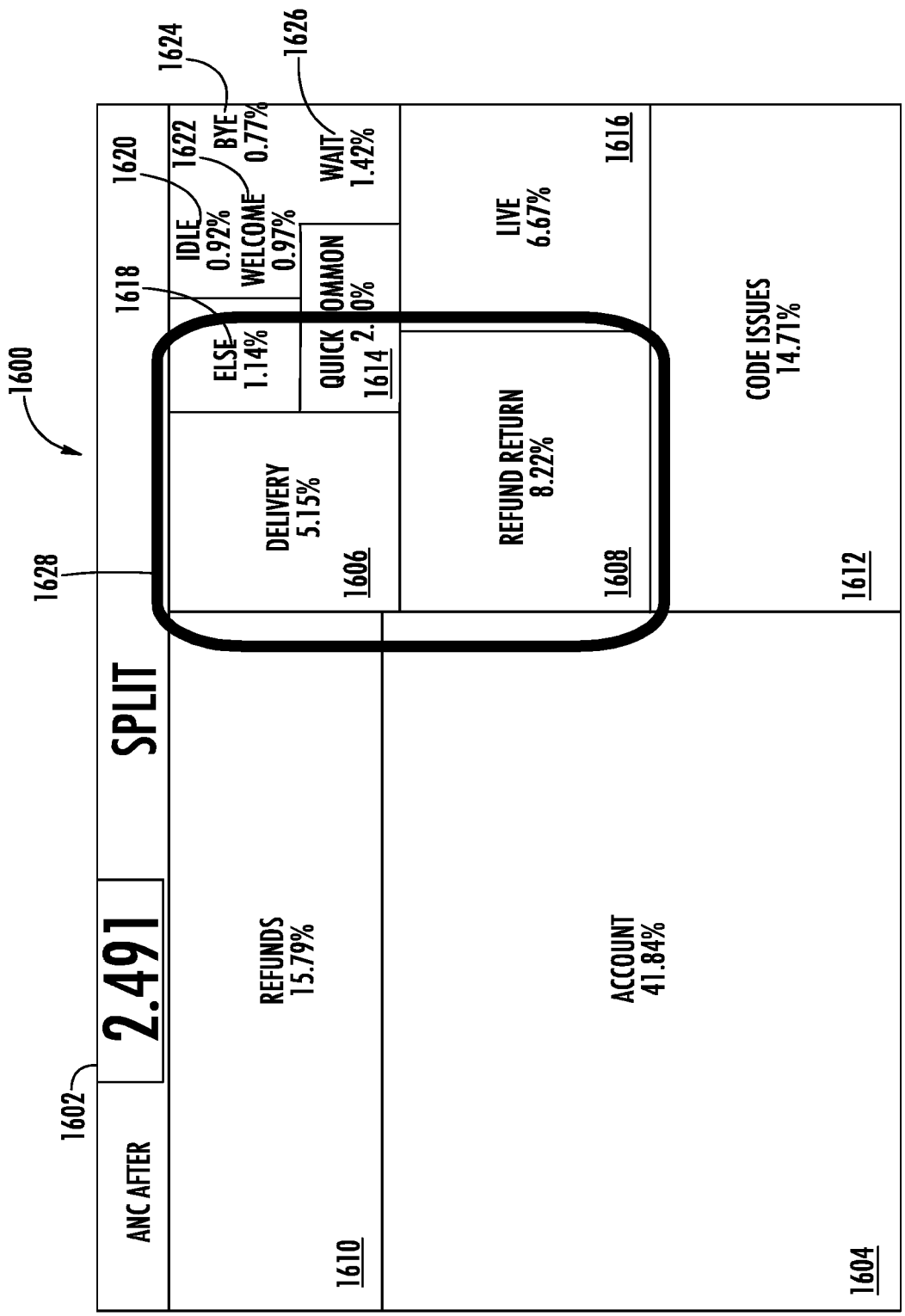
FIG. 16 illustrates example data 1600 comprising an example first ANC value and example first heatmap visualization data in accordance with some example embodiments.

FIG. 16 illustrates example data 1600 comprising an example first ANC value and example first heatmap visualization data in accordance with some example embodiments. As shown in FIG. 16, example data 1600 comprises first ANC value 1602 (e.g., "2.491") and a first set of webpage nodes comprising webpage leaf 1604 (e.g., "Account"; "41.84%"), webpage leaf 1606 (e.g., "Delivery"; "5.15%"), webpage leaf 1608 (e.g., "Refund Return"; "8.22%"), webpage leaf 1610 (e.g., "Refunds"; "15.79%"), webpage leaf 1612 (e.g., "Code issues"; "14.71%"), webpage leaf 1614 (e.g., "Quick Common"; "2.40%"), webpage leaf 1616 (e.g., "Live"; "6.67%"), webpage leaf 1618 (e.g., "Else"; "1.14%"), webpage leaf 1620 (e.g., "Idle"; "0.92%"), webpage leaf 1622 (e.g., "Welcome"; "0.97%"), webpage leaf 1624 (e.g., "Bye"; "0.77%"), and webpage leaf 1626 (e.g., "Wait"; "1.42%"). Annotation 1628 illustrates the splitting of webpage leaves 1606 and 1608. In some instances, the splitting of webpage nodes or webpage leaves may be referred to as a category split or a subcategory split.

Figure 17:
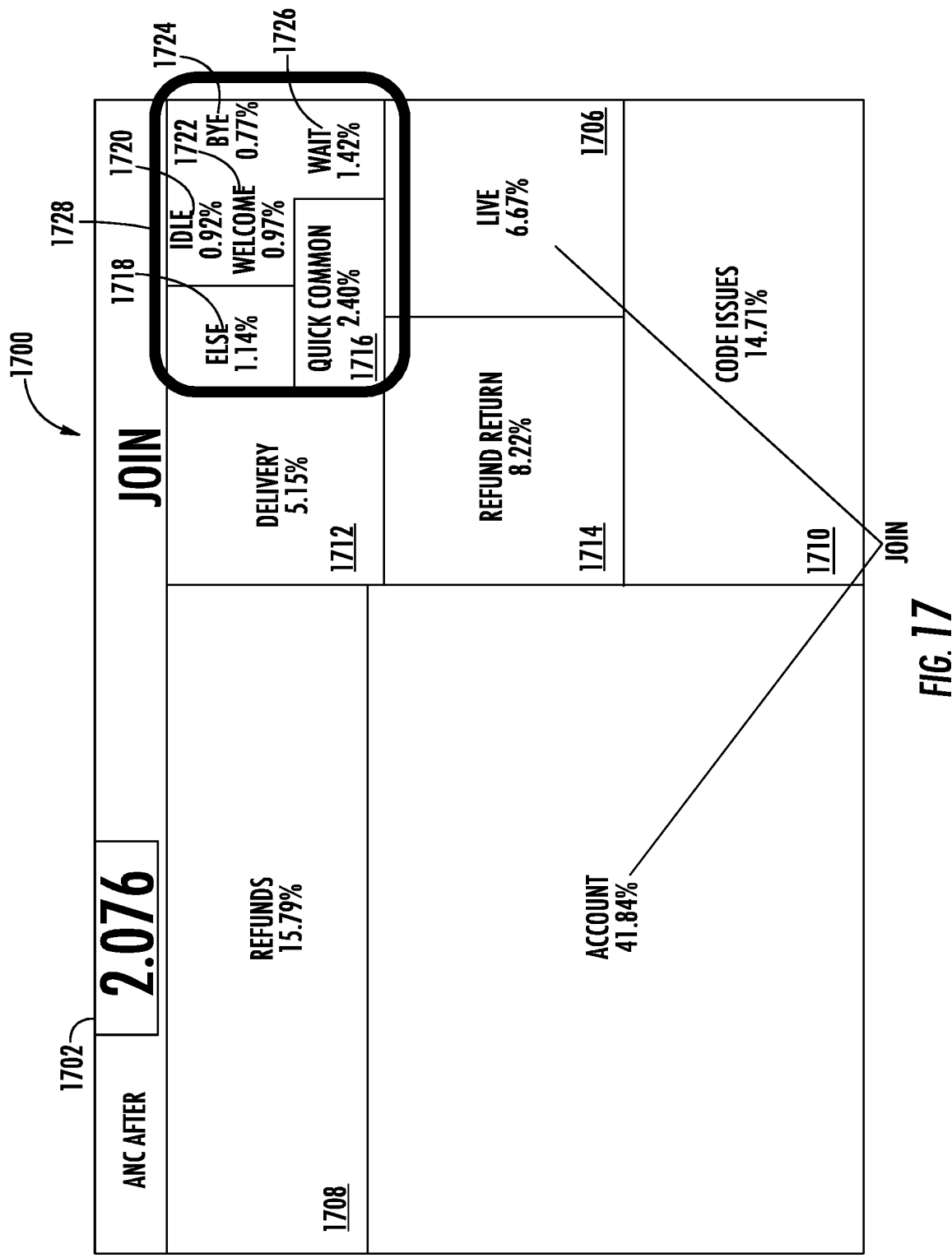
FIG. 17 illustrates example data 1700 comprising an example second ANC value and example second heatmap visualization data in accordance with some example embodiments.

FIG. 17 illustrates example data 1700 comprising an example second ANC value and example second heatmap visualization data in accordance with some example embodiments. As shown in FIG. 17, example data 1700 comprises second ANC value 1702 (e.g., "2.076") and a second set of webpage nodes comprising webpage leaf 1704 (e.g., "Account"; "41.84%"), webpage leaf 1706 (e.g., "Live"; "6.67%"), webpage leaf 1708 (e.g., "Refunds"; "15.79%"), webpage leaf 1710 (e.g., "Code issues"; "14.71%"), webpage leaf 1712 (e.g., "Delivery"; "5.15%"), webpage leaf 1714 (e.g., "Refund Return"; "8.22%"), webpage leaf 1716 (e.g., "Quick Common"; "2.40%"), webpage leaf 1718 (e.g., "Else"; "1.14%"), webpage leaf 1720 (e.g., "Idle"; "0.92%"), webpage leaf 1722 (e.g., "Welcome"; "0.97%"), webpage leaf 1724 (e.g., "Bye"; "0.77%"), and webpage leaf 1726 (e.g., "Wait"; "1.42%"). Annotation 1728 illustrates the joining (e.g., merging) of webpage leaves 1704 and 1706. In some instances, the joining of webpage nodes or webpage leaves may be referred to as a category merge or a subcategory merge.

Figure 18:
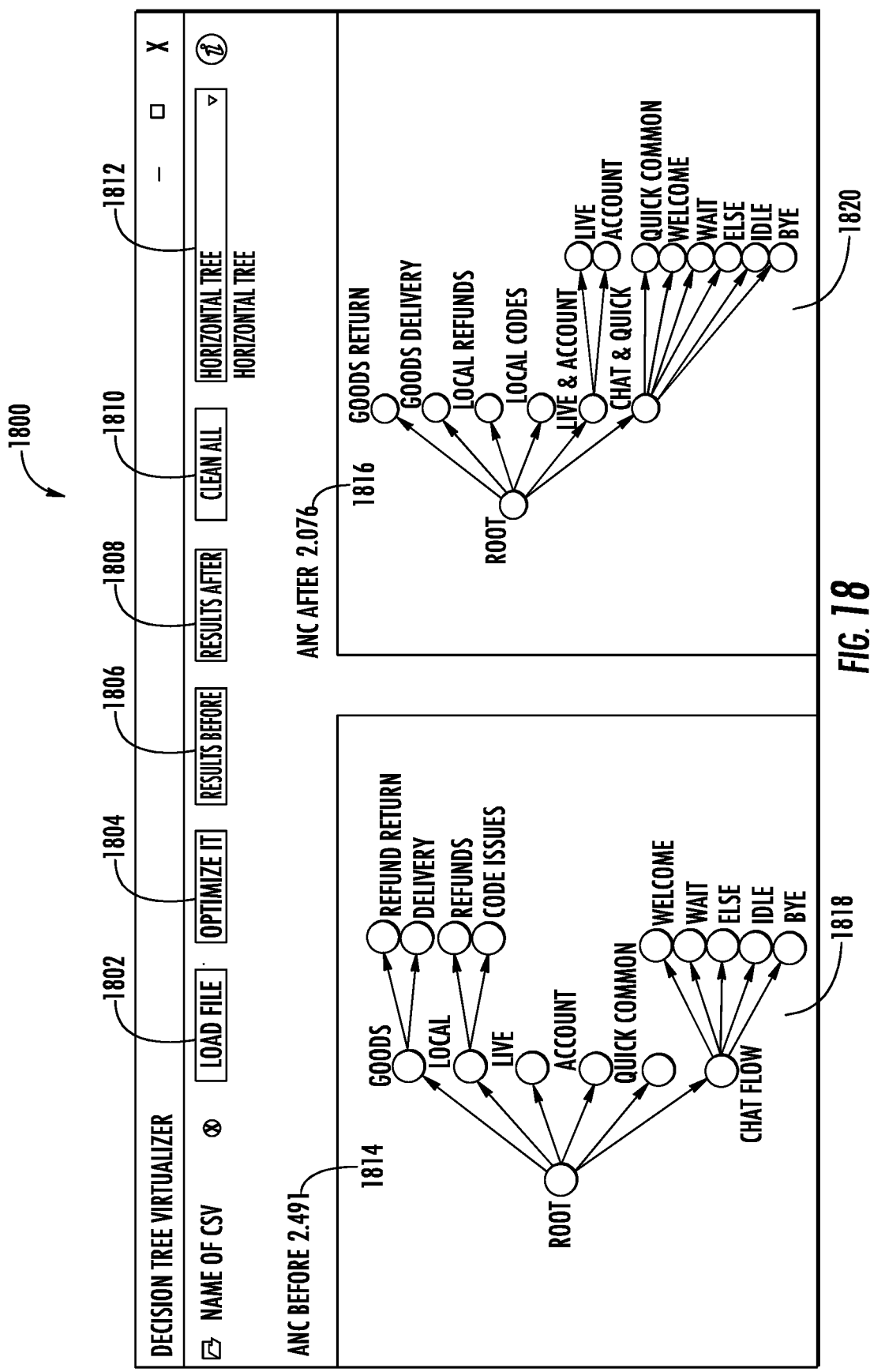
FIG. 18 illustrates an example display screen 1800 comprising various DTV data in accordance with some example embodiments.

FIG. 18 illustrates an example display screen 1800 comprising various DTV data in accordance with some example embodiments. In some embodiments, example display screen 1800 provides a display for a standalone desktop GUI application (e.g., "DECISION TREE VIRTUALIZER") that provides visualization of webpage decision tree structures before and after optimization with implemented optimization algorithms. As shown in FIG. 18, example display screen 1800 comprises selectable icon 1802 (e.g., "Load File"), selectable icon 1804 (e.g., "Optimize it!"), selectable icon 1806 (e.g., "Results before"), selectable icon 1808 (e.g., "Results after"), selectable icon 1810 (e.g., "Clean all"), selectable drop down menu icon 1812 (e.g., "Horizontal Tree"), first ANC value 1814 (e.g., "2.491"), second ANC value 1816 (e.g., "2.076"), first tree visualization data 1818 (e.g., first horizontal tree visualization data), and second tree visualization data 1820 (e.g., second horizontal tree visualization data).

Figure 19:
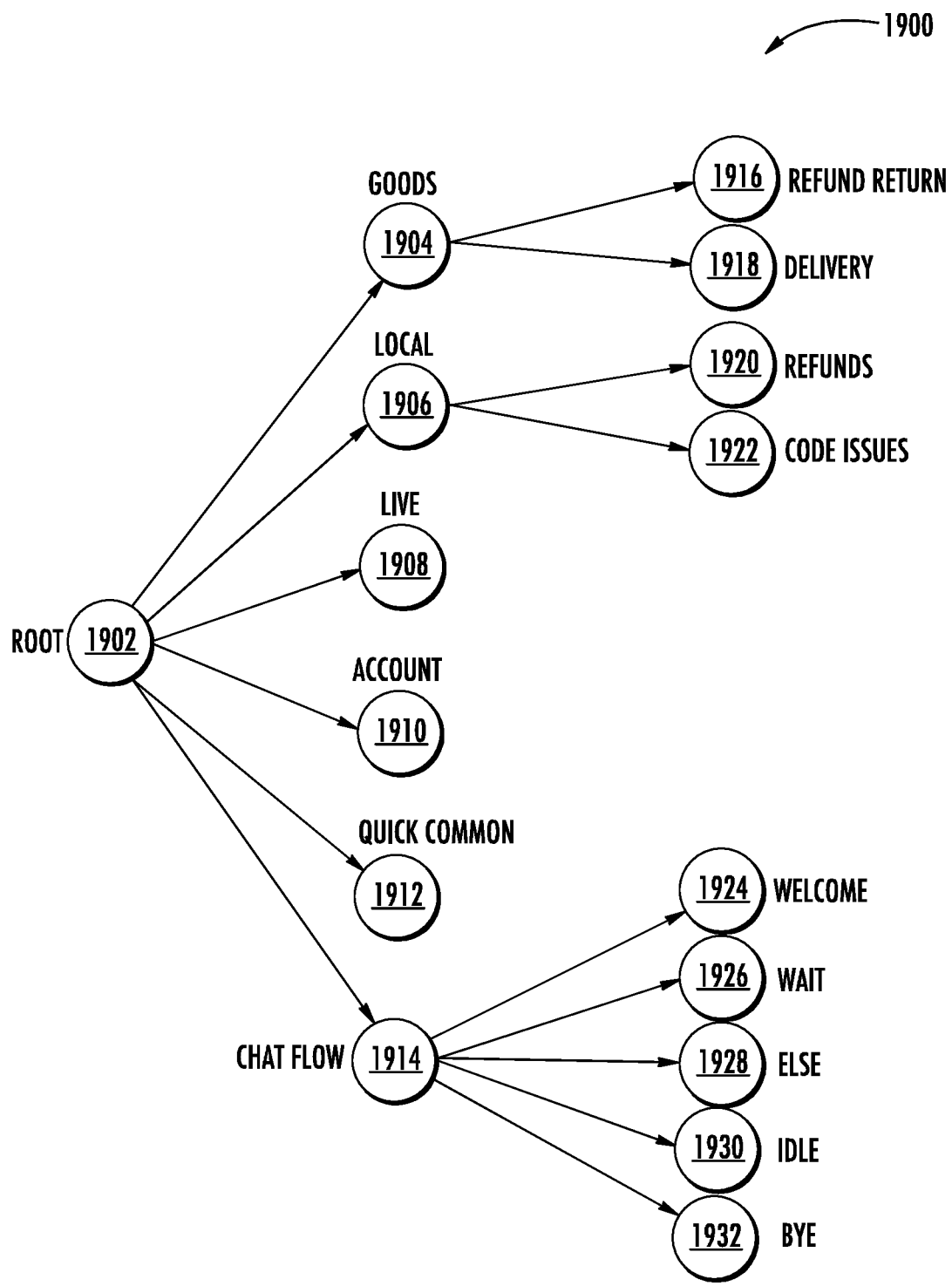
FIG. 19 illustrates example data 1900 comprising example first tree visualization data in accordance with some example embodiments.

FIG. 19 illustrates example data 1900 comprising example first horizontal tree visualization data in accordance with some example embodiments. As shown in FIG. 19, example data 1900 comprises a first set of webpage nodes comprising webpage node 1902 (e.g., "root"); webpage node 1904 (e.g., "GOODS), webpage leaf 1916 (e.g., "REFUND RETURN"), and webpage leaf 1918 (e.g., "DELIVERY") associated with the category "GOODS"; webpage node 1906 (e.g., "LOCAL"), webpage leaf 1920 (e.g., "REFUNDS"), and webpage leaf 1922 (e.g., "CODE ISSUES") associated with the category "LOCAL"; webpage leaf 1908 (e.g., "LIVE") associated with the category "LIVE"; webpage leaf 1910 (e.g., "ACCOUNT") associated with the category "ACCOUNT"; webpage leaf 1912 (e.g., "QUICK COMMON") associated with the category "QUICK COMMON"; and webpage node 1914 (e.g., "CHAT FLOW"), webpage leaf 1924 (e.g., "WELCOME"), webpage leaf 1926 (e.g., "WAIT"), webpage leaf 1928 (e.g., "ELSE"), webpage leaf 1930 (e.g., "IDLE"), and webpage leaf 1932 (e.g., "BYE") associated with the category "CHAT FLOW".

Figure 20:
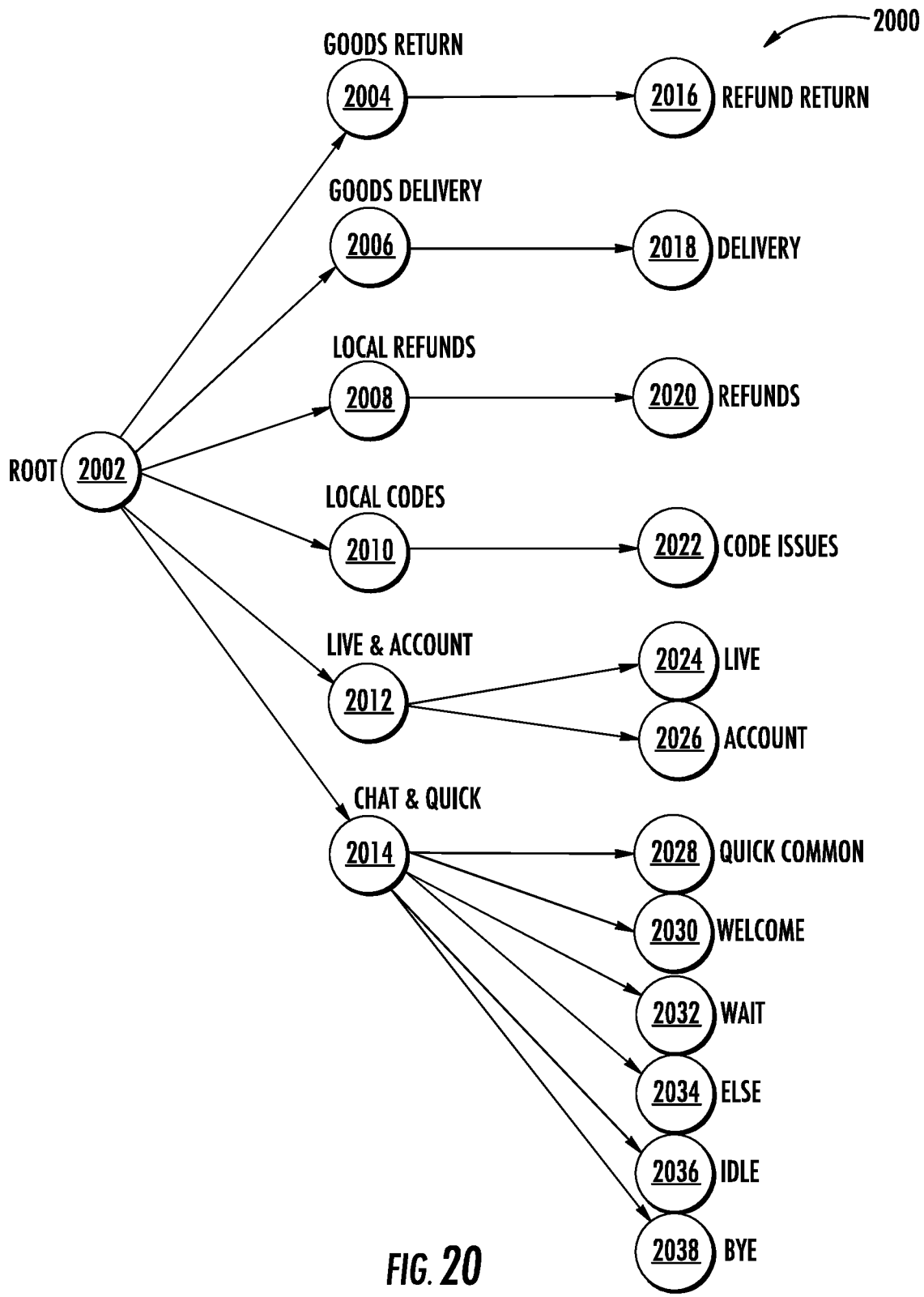
FIG. 20 illustrates example data 2000 comprising example second tree visualization data in accordance with some example embodiments.

FIG. 20 illustrates example data 2000 comprising example second horizontal tree visualization data in accordance with some example embodiments. As shown in FIG. 20, example data 2000 comprises a second set of webpage nodes comprising webpage node 2002 (e.g., "root"); webpage node 2004 (e.g., "GOODS RETURN") and webpage leaf 2016 (e.g., "REFUND RETURN") associated with the category "GOODS RETURN"; webpage node 2006 (e.g., "GOODS DELIVERY") and webpage leaf 2018 (e.g., "DELIVERY") associated with the category "GOODS DELIVERY"; webpage node 2008 (e.g., "LOCAL REFUNDS") and webpage leaf 2020 (e.g., "REFUNDS") associated with the category "LOCAL REFUNDS"; webpage node 2010 (e.g., "LOCAL CODES") and webpage leaf 2022 (e.g., "CODE ISSUES") associated with the category "LOCAL CODES"; webpage node 2012 (e.g., "LIVE & ACCOUNT"), webpage leaf 2024 (e.g., "live"), and webpage leaf 2026 (e.g., "ACCOUNT") associated with the category "LIVE & ACCOUNT"; and webpage node 2014 (e.g., "CHAT & QUICK"), webpage leaf 2028 (e.g., "QUICK COMMON"), webpage leaf 2030 (e.g., "WELCOME"), webpage leaf 2032 (e.g., "WAIT"), webpage leaf 2034 (e.g., "ELSE"), webpage leaf 2036 (e.g., "IDLE"), and webpage leaf 2038 (e.g., "BYE") associated with the category "CHAT & QUICK".

Figure 21:
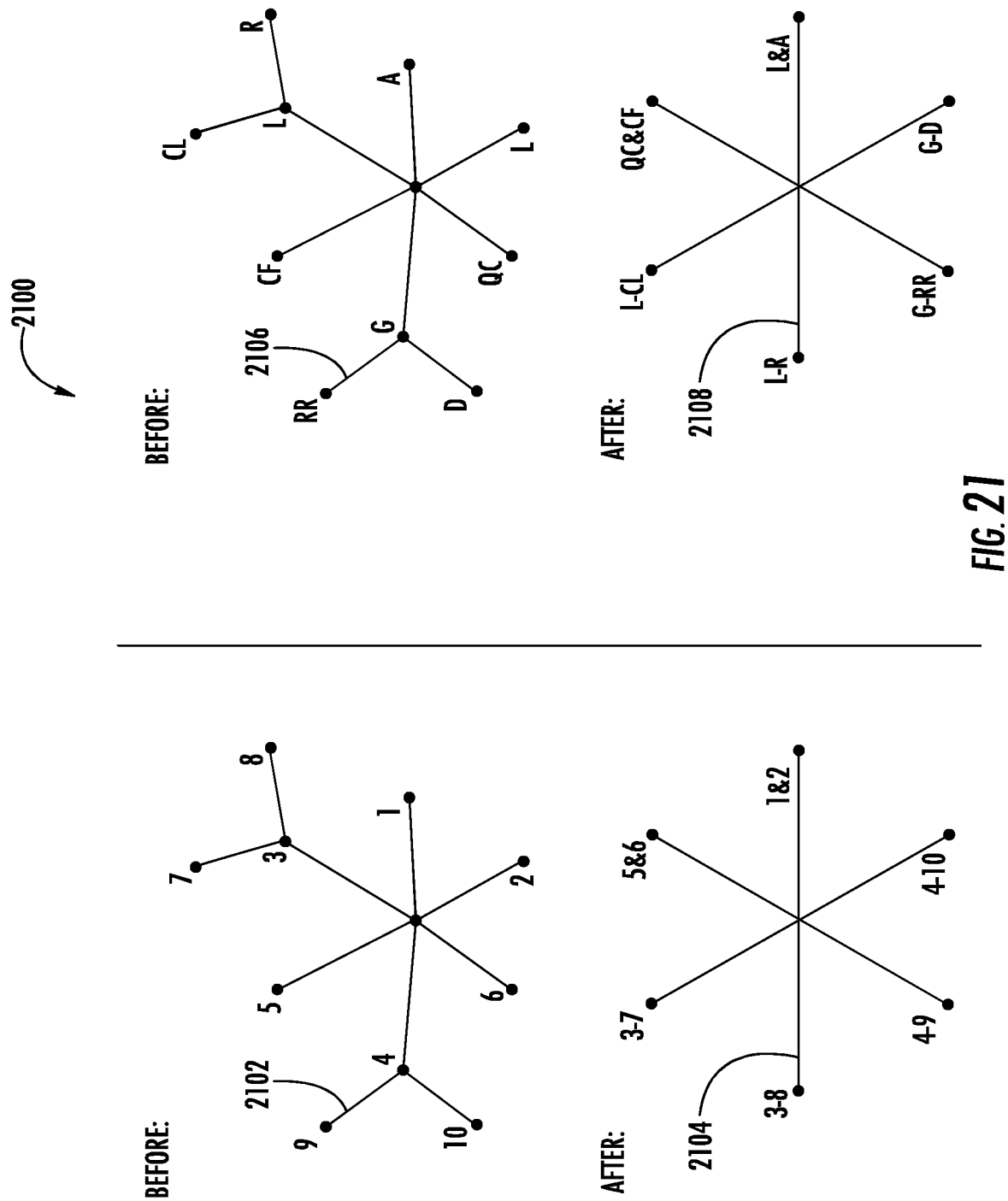
FIG. 21 illustrates example data 2100 comprising example first graph visualization data and example second graph visualization data in accordance with some example embodiments.

FIG. 21 illustrates example data 2100 comprising example first graph visualization data (e.g., before optimization) and example second graph visualization data (e.g., after optimization) in accordance with some example embodiments. In some embodiments, example data 2100 may comprise example first graph visualization data 2102 and example second graph visualization data 2104 with label anonymization (e.g., digitization) in accordance with some example embodiments. For example, the webpage optimization system may: generate webpage node "1&2" by joining (e.g., merging) webpage node "1" and webpage node "2"; generate webpage node "5&6" by joining webpage node "5" and webpage node "6"; and move (e.g., elevate)

webpage node "7," webpage node "8," webpage node "9," and webpage node "10" to a higher level according to hex-tree constraints (e.g., a maximum of six options at a specific tree level). In some embodiments, example data 2100 may comprise example first graph visualization data 2106 and example second graph visualization data 2108 without label anonymization (e.g., without digitization) in accordance with some example embodiments. For example, the webpage optimization system may: generate webpage node "L&A" by joining webpage node "L" and webpage node "A"; generate webpage node "QC&CF" by joining webpage node "CF" and webpage node "QC"; and move webpage node "CI," webpage node "R," webpage node "RR," and webpage node "D" to a higher level according to hex-tree constraints (e.g., a maximum of six options at a specific tree level).

Figure 22:
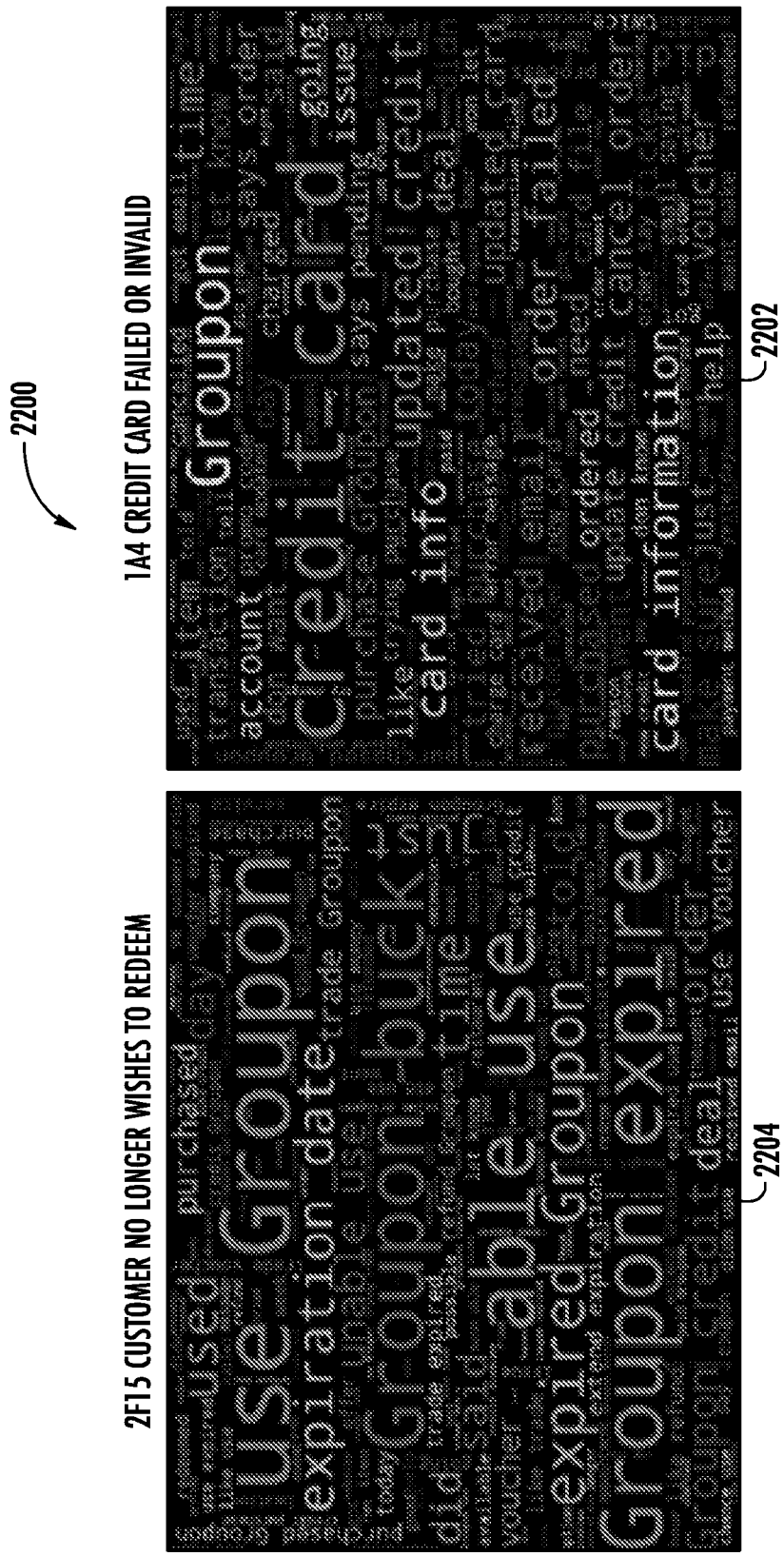
FIG. 22 illustrates example data 2200 comprising example first word cloud visualization data and example second word cloud visualization data in accordance with some example embodiments.

FIG. 22 illustrates example data 2200 comprising example first word cloud visualization data 2202 (e.g., "2F15 Customer no longer wishes to redeem") and example second word cloud visualization data 2204 (e.g., "1A4 Credit card failed or invalid") in accordance with some example embodiments. In some embodiments, the webpage optimization system may generate each of the example first word cloud visualization data 2202 and the example second word cloud visualization data 2204 are based on aggregated and anonymized data of customers, such as emails and chat conversations, including over 50,000 customer contact reasons. As a result, the webpage optimization system described herein may provide semantical separation based on textual data to distinguish customer issues based, in some instances, solely on contact reasons. In some embodiments, the webpage optimization system may apply deep learning techniques to increase accuracy to over 94 percent.

Example Operations for Optimizing Webpages

Figure 23:
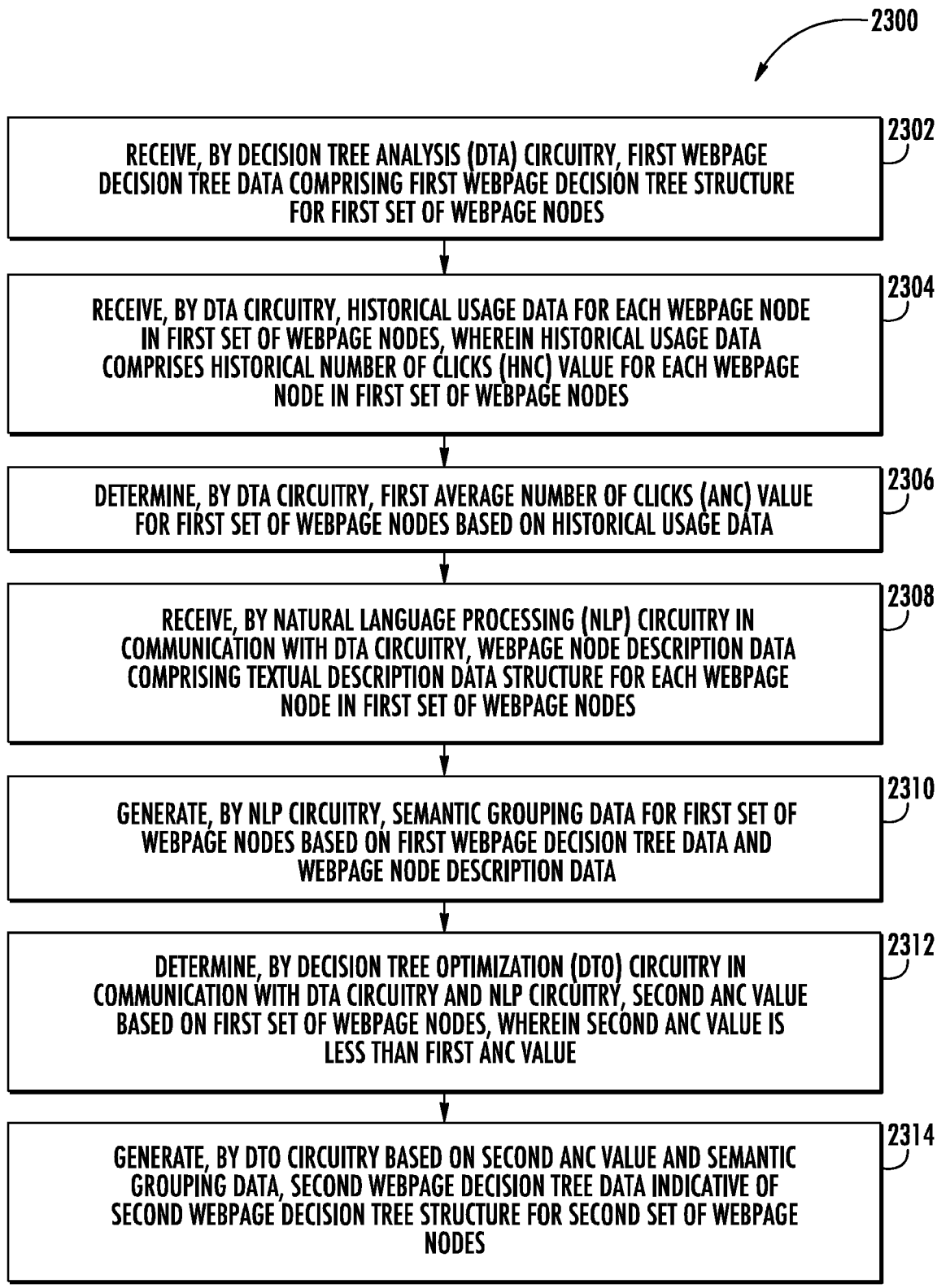
FIG. 23 illustrates an example flowchart 2300 for optimizing a webpage in accordance with some example embodiments.

FIG. 23 illustrates an example flowchart 2300 that contains example operations for optimizing a webpage according to an example embodiment. The operations illustrated in FIG. 23 may, for example, be performed by one or more components described with reference to webpage optimization system 102 shown in FIG. 1, by a user device 110, an agent device 112, or a data storage device 114 in communication with webpage optimization system 102; by apparatus 200 shown in FIG. 2; by any other component described herein; or by any combination thereof. In some embodiments, the various operations described in connection with FIG. 23 may be performed by the apparatus 200 by or through the use of one or more of processing circuitry 202, memory 204, input-output circuitry 206, communications circuitry 208, DTA circuitry 210, NLP circuitry 212, DTO circuitry 214, DTV circuitry 216, DTR circuitry 218, any other suitable circuitry, and any combination thereof.

As shown by block 2302, the apparatus 200 includes means, such as DTA circuitry 210 or the like, for receiving first webpage decision tree data comprising a first webpage decision tree structure for a first set of webpage nodes. In some embodiments, the first webpage decision tree data may be a CSV data file (e.g., CSV data file 1400). In some embodiments, the apparatus 200 may receive the first webpage decision tree data from a computing device (e.g., data storage device 114, agent device 112), as described in more detail with reference to FIGS. 1-3, 11, 13, and 18. For example, the DTA circuitry 210 of apparatus 200 may transmit a request for the first webpage decision tree data to a data storage device, and, in response to the request, the data storage device may transmit the first webpage decision tree data to the DTA circuitry 210. In another example, an agent may use an agent device to click a selectable icon (e.g., selectable "Load File" icon 1302, selectable "Load File" icon 1802) and select a CSV data file (e.g., CSV data file 1400) comprising the first webpage decision tree data. In response to the agent's selection, the agent device may transmit the selected CSV data file comprising the first webpage decision tree data to the DTA circuitry 210 of apparatus 200. The DTA circuitry 210 may receive the CSV data file from the agent device and perform ETL operations on the received CSV data file to receive the first webpage decision tree data. In still other embodiments, the apparatus 200 may receive the first webpage decision tree data from the memory 204 of apparatus 200.

As shown by block 2304, the apparatus 200 includes means, such as the DTA circuitry 210 or the like, for receiving historical usage data for each webpage node in the first set of webpage nodes. In some instances, the historical usage data may comprise a historical number of clicks (HNC) value for each webpage node in the first set of webpage nodes. In some instances, the historical usage data may further comprise historical logs, historical user behavior data, or both. In some embodiments, the apparatus 200 may receive the historical usage data from a computing device (e.g., data storage device 114, agent device 112), as described in more detail with reference to FIGS. 1-4, 11, 13, and 18. For example, the DTA circuitry 210 of apparatus 200 may transmit a request for the historical usage data to a data storage device, and, in response to the request, the data storage device may transmit the historical usage data to the DTA circuitry 210. In another example, an agent may use an agent device to click a selectable icon (e.g., selectable "Load File" icon 1302, selectable "Load File" icon 1802) and select a CSV data file (e.g., CSV data file 1400) comprising the historical usage data. In response to the agent's selection, the agent device may transmit the selected CSV data file comprising the historical usage data to the DTA circuitry 210 of apparatus 200. The DTA circuitry 210 may receive the CSV data file from the agent device and perform ETL operations on the received CSV data file to receive the historical usage data. In still other embodiments, the apparatus 200 may receive the first webpage decision tree data from the memory 204 of apparatus 200.

As shown by block 2306, the apparatus 200 includes means, such as the DTA circuitry 210 or the like, for determining a first average number of clicks (ANC) value for the first set of webpage nodes based on the first webpage decision tree data and the historical usage data. In some embodiments, the apparatus 200 may determine the first ANC value as described in more detail with reference to FIGS. 1-4, 11, 13, 16, and 18. For example, the apparatus 200 may determine the first ANC value by dividing the sum of the total number of clicks by the sum of the number of clicks per webpage node (e.g., macro code), as described in more detail with reference to FIG. 4.

As shown by block 2308, the apparatus 200 includes means, such as the NLP circuitry 212 or the like, for receiving webpage node description data comprising a textual description data structure for each webpage node in the first set of webpage nodes. In some embodiments, the apparatus 200 may receive the webpage node description data from a computing device (e.g., data storage device 114, agent device 112) as described in more detail with reference to FIGS. 1-3, 12, 13, and 18. For example, the NLP circuitry 212 of apparatus 200 may transmit a request for the webpage node description data to a data storage device, and, in response to the request, the data storage device may transmit the webpage node description data to the NLP circuitry 212. In another example, an agent may use an agent device to click a selectable icon (e.g., selectable "Load File" icon 1302, selectable "Load File" icon 1802) and select a CSV data file (e.g., CSV data file 1400) comprising the webpage node description data. In response to the agent's selection, the agent device may transmit the selected CSV data file comprising the webpage node description data to the NLP circuitry 212 of apparatus 200. The NLP circuitry 212 may receive the CSV data file from the agent device and perform text mining operations on the received CSV data file to receive the webpage node description data. In still other embodiments, the apparatus 200 may receive the webpage node description data from the memory 204 of apparatus 200.

As shown by block 2310, the apparatus 200 includes means, such as the NLP circuitry 212 or the like, for generating semantic grouping data for the first set of webpage nodes based on the first webpage decision tree data and the webpage node description data. In some embodiments, the apparatus 200 may generate the semantic grouping data as described in more detail with reference to FIGS. 1-3, 12, 13, and 18. For example, the apparatus 200 may generate the semantic grouping data based on an unsupervised clustering technique, such as NLP clustering.

As shown by block 2312, the apparatus 200 includes means, such as the DTO circuitry 214 or the like, for determining a second ANC value based on the first set of webpage nodes. In some instances, the second ANC value is less than the first ANC value. In some embodiments, the apparatus 200 may determine the second ANC value as described in more detail with reference to FIGS. 1-7, 11, 13, 17, and 18. For example, the apparatus 200 may determine the second ANC value based on an ANC optimization technique, such as a naive technique, a greedy technique, an exhaustive search technique, or a combination thereof, as described in more detail with reference to FIGS. 5-7 and 11.

As shown by block 2314, the apparatus 200 includes means, such as the DTO circuitry 214 or the like, for generating, based on the second ANC value and the semantic grouping data, second webpage decision tree data indicative of a second webpage decision tree structure for a second set of webpage nodes. In some embodiments, the apparatus 200 may generate the second webpage decision tree data as described in more detail with reference to FIGS. 1-3, 8-13, 15, 17, 18, and 20. In one illustrative example, an agent may use an agent device (e.g., agent device 112) to click a selectable icon (e.g., selectable "Optimize it!" icon 1304, selectable "Optimize it!" icon 1804). In response, the agent device may generate a request for the second webpage decision tree data and transmit the generated request to the DTO circuitry 214 of apparatus 200. The DTO circuitry 214 may receive the request from the agent device and generate the second webpage decision tree data.

In some embodiments, the operations described with reference to blocks 2302, 2304, 2306, 2308, 2310, 2312, and 2314 may not necessarily occur in the order depicted in FIG. 23, and in some cases one or more of the operations depicted in FIG. 23 may occur substantially simultaneously, or additional steps may be involved before, after, or between any of the operations shown in FIG. 23.

As noted above, computing systems, computing apparatuses, computing methods, and computer program products are described herein that optimize webpages. By doing so, webpage users and agents are able to avoid the traditional problems surrounding webpage navigation. For instance, through performance of the above operations, users may save time when exploring webpages due to the minimized number of clicks and simplified content exploration. Further, the optimal webpage decision tree structures described herein simplify the navigation and searching of webpage content and, in some instances, are more intuitive for users. Additionally, in some embodiments, the optimal webpage decision tree structures described herein improve the accuracy of machine learning prediction algorithms and the precision of recommendations (e.g., per single user) over traditional systems.

FIG. 23 thus illustrates a flowchart describing the operation of various computing systems (e.g., webpage optimization system 102 described with reference to FIG. 1), computing apparatuses (e.g., apparatus 200 described with reference to FIG. 2), computing methods, and computer program products according to example embodiments contemplated herein. It will be understood that each operation of flowchart 2300, and combinations of operations in flowchart 2300, may be implemented by various means, such as hardware, firmware, processor, circuitry, and/or other devices associated with execution of software including one or more computer-executable program code instructions. For example, one or more of the procedures described above may be performed by execution of program code instructions. In this regard, the program code instructions that, when executed, cause performance of the procedures described above may be stored by a non-transitory computer-readable storage medium (e.g., memory 204) of a computing apparatus (e.g., apparatus 200) and executed by a processor (e.g., processing circuitry 202) of the computing apparatus. As will be appreciated, any such program code instructions may be loaded onto a computer or other programmable apparatus (e.g., hardware) to produce a machine, such that the resulting computer or other programmable apparatus implements the functions specified in the operations of flowchart 2300. These program code instructions may also be stored in a computer-readable memory that may direct a computer or other programmable apparatus to function in a particular manner, such that the instructions stored in the computer-readable memory produce an article of manufacture, the execution of which implements the functions specified in the operations of flowchart 2300. The program code instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the operations of flowchart 2300.

The flowchart operations described with reference to FIG. 23 support combinations of means for performing the specified functions and combinations of operations for performing the specified functions. It will be understood that one or more operations of the flowchart, and combinations of operations in the flowchart, can be implemented by special purpose hardware-based computer systems which perform the specified functions, or combinations of special purpose hardware and computer instructions.

Use Cases

Having described example embodiments in general terms, the following example embodiments are provided to further illustrate a use case of some example embodiments. In some instances, the following example embodiments provide examples of how the webpage optimization system disclosed herein may generate an optimal webpage decision tree structure based on ANC optimization techniques, NLP techniques, or both. In some instances, the following example embodiments provide examples of the ways in which the webpage optimization system disclosed herein may generate DTV data based on first webpage decision tree data (e.g., before optimization), second webpage decision tree data (e.g., after optimization), any other data disclosed herein, any other suitable data or electronic information, or any combination thereof.

"Pizza Portal" Use Case

"Pizza Portal" is an illustrative example use case wherein the webpage optimization system disclosed herein may generate an interactive visualization referred to herein as the "Pizza Portal" and described in greater detail below with reference to FIGS. 24-27.

Figure 24:
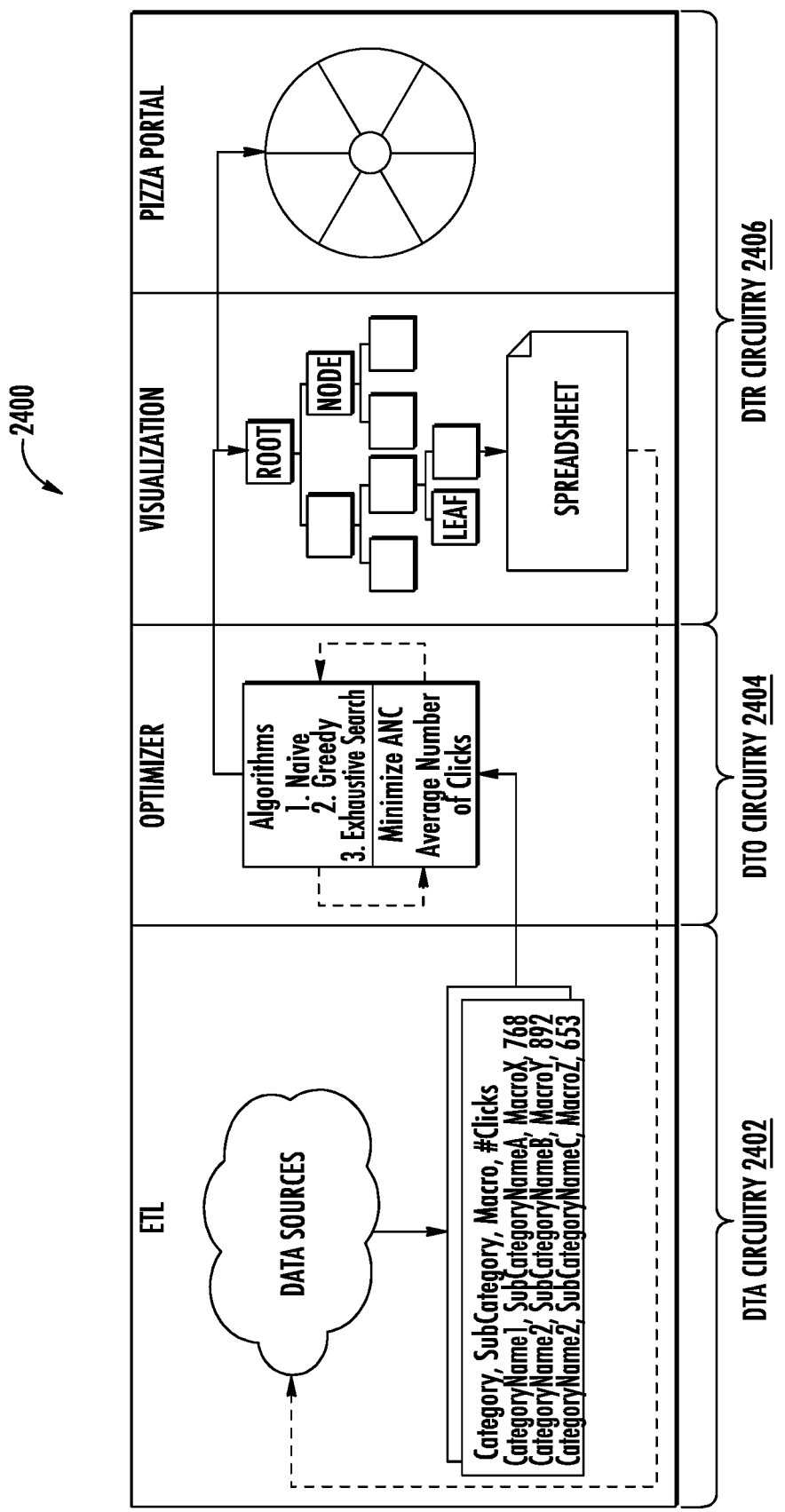
FIG. 24 illustrates an example architecture diagram 2400 in accordance with some example embodiments.

FIG. 24 illustrates an example architecture diagram 2400 for optimizing webpages based in part on ANC optimization techniques in accordance with some example embodiments. In some embodiments, example architecture diagram 2400 provides an architecture overview of an example four-stage process for performing decision tree optimization based on minimization of the historical number of clicks. As shown in FIG. 24, DTA circuitry 2402 performs ETL operations by extracting data from a data storage device (e.g., a data warehouse) comprising information about number of clicks for each webpage leaf (e.g. macro chosen by an agent using an agent device). DTO circuitry 2404 compares different ANC optimization techniques based on proposed ANC values. In some instances, DTO circuitry 2404 generates different decision tree structures based on heuristic rule set. DTO circuitry 2404 achieves an improvement in effectiveness by minimizing the number of clicks by thirty percent for the greedy technique. DTV circuitry 2406 generates a desktop application (e.g., a "decision tree virtualizer" GUI application) comprising DTV data that displays decision tree structures before and after optimization as well as the ANC values associated therewith. In some instances, DTV circuitry 2406 further generates a spreadsheet based on the optimal webpage decision tree structure. In some instances, DTV circuitry 2406 further generates a "Pizza Portal" based on the optimal webpage decision tree structure.

Figure 25:
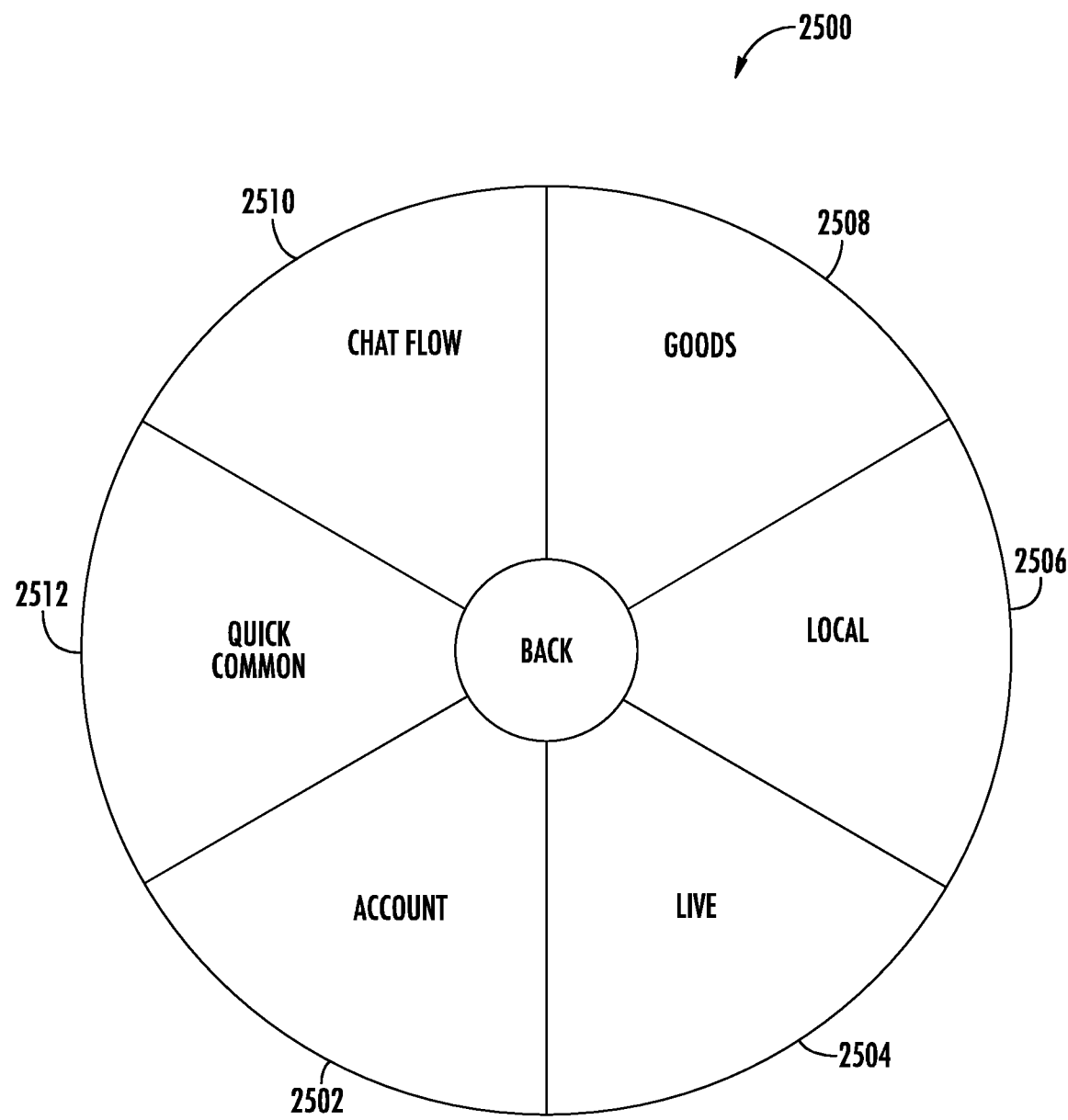
FIG. 25 illustrates example data 2500 comprising an example "pizza portal" in accordance with some example embodiments.

FIG. 25 illustrates example data 2500 comprising an example "pizza portal" in accordance with some example embodiments. As shown in FIG. 25, the example "pizza portal" comprises selectable area 2502 (e.g., "Account"), selectable area 2504 (e.g., "Live"), selectable area 2506 (e.g., "Local"), selectable area 2508 (e.g., "Goods"), selectable area 2510 (e.g., "Chat Flow"), selectable area 2512 (e.g., "Quick Common"), and selectable area 2514 (e.g., "Back"). In some embodiments, an agent may use an agent device to select one of selectable areas 2502, 2504, 2506, 2508, 2510, 2512, and 2514. In response, the webpage optimization system may generate a popup display, display screen overlay, or second "Pizza Portal" display screen to obtain additional information regarding the category associated with that selectable area. At any time, the agent may click selectable area 2514 to return to a previous display screen, such as the "Pizza Portal" display screen shown in FIG. 25.

Figure 26:
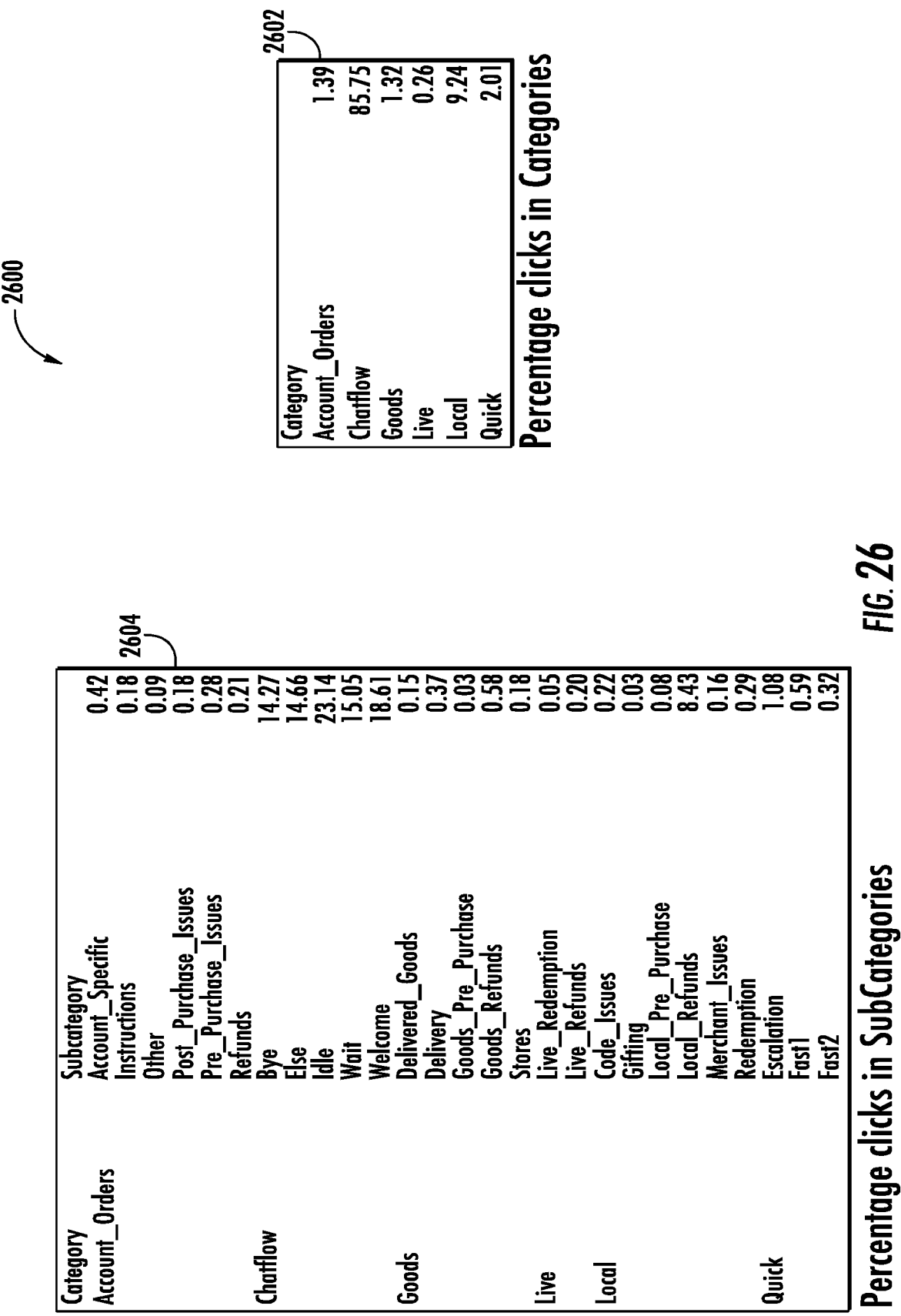
FIG. 26 illustrates example data 2600 comprising example statistical data in accordance with some example embodiments.

FIG. 26 illustrates example data 2600 comprising example statistical data, such as category statistical data 2602 (e.g., percentage clicks in categories) and subcategory statistical data 2604 (e.g., percentage clicks in subcategories), in accordance with some example embodiments. In some embodiments, the webpage optimization system described herein may generate the "Pizza Portal" based on example data 2600.

FIG. 27 illustrates example data 2700 comprising an example potential optimization report in accordance with some example embodiments.

Pizza Portal may be implemented using software, hardware, circuitry, memory, or a combination thereof that allows customer service agents using user devices easy navigation through different issues related to customer needs. Navigation may take place during telephone, chat or e-mail contact. For instance, Pizza Portal may be implemented according to the most common customer issues and provide a visual representation of a hex-tree. Simple navigation provides access to rich content in a few clicks by clicking different "pizza elements," such as selectable areas 2502, 2504, 2506, 2508, 2510, and 2512 shown in FIG. 25. The selectable areas 2514 (e.g., the middle button) provides access to a higher level (e.g., allows the user to go back). After clicking a selectable area, lower or higher level text descriptions are refreshed on the pizza elements to display the appropriate content. The total number of clicks in Pizza Portal by a control group from customer service in the first two months after deployment was almost 40,000. The percentage distribution of these clicks is shown in FIG. 26. Extending the portal of additional shortcut keys for the most frequently chosen options could, in some instances, reduce the number of clicks by over 60 percent. This improvement will result with new buttons with the most popular options. Further, this approach is more effective than reorganizing the decision tree and can be performed independently.

"Customer Service" Use Case

"Customer Service" is an illustrative example use case wherein the webpage optimization system disclosed herein has optimized a webpage based on statistical data according to the decision tree improvements. The "Customer Service" use case is described in greater detail below with reference to FIGS. 28-30.

Figure 28:
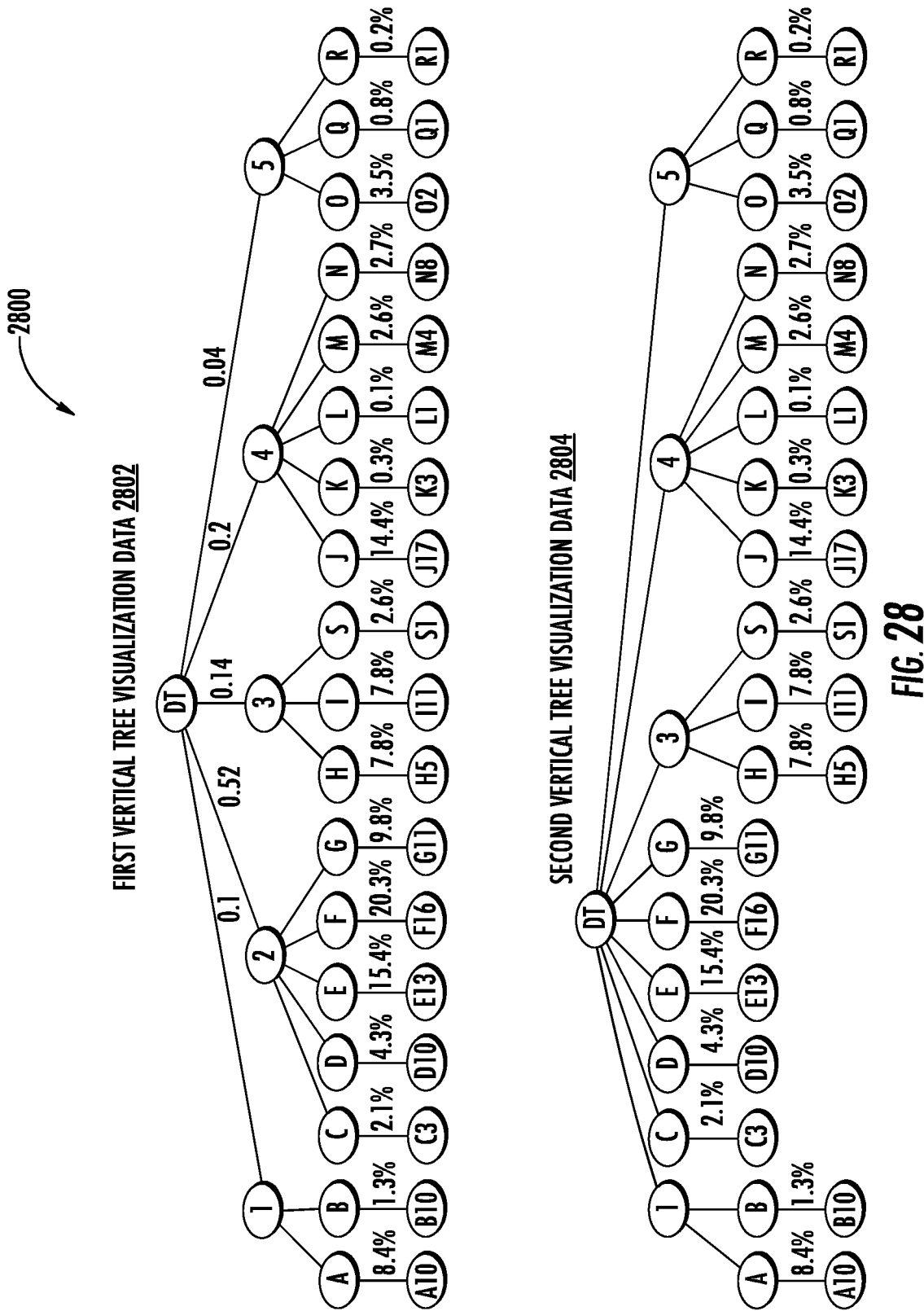
FIG. 28 illustrates example data 2800 comprising example first tree visualization data and example second tree visualization data in accordance with some example embodiments.

FIG. 28 illustrates example data 1900 comprising example first vertical tree visualization data 2802 (e.g., before optimization) and example second vertical tree visualization data 2804 (e.g., after optimization) in accordance with some example embodiments. As shown in FIG. 28, example first vertical tree visualization data 2802 comprises aggregated Decision Tree stats based on historical usage reports (e.g., how often customer services agents choose specific options). Example first vertical tree visualization data 2802 comprises three webpage decision tree levels: categories 1, 2, 3, 4, and 5; subcategories A, B, C, D, E, F, G, H, I, S, J, K, L, M, N, O, Q, R; and subsubcategories denoted as A10, B10, C3, D10, E13, F16, G11, H5, I11, S1, J17, K3, L1, M4, N8, O2, Q1, and R1. Example first vertical tree visualization data 2802 comprises over 120 subsubcategories. For instance, webpage node "A10" indicates that there are 10 subsubcategories. The values shown at the branches are percentage statistics of chosen options. Moreover, the decision tree shown in FIG. 28 has been growing in the past five years and thus reorganizing it would simplify the work of customer service agents.

The webpage optimization system disclosed herein may apply ANC optimization techniques to reduce DT topology as illustrated by second vertical tree visualization data 2804. Example second vertical tree visualization data 2804 comprises three webpage decision tree levels: categories 1, C, D, E, F, G, 3, 4, and 5; subcategories A, B, C3, D10, E13, F16, G11, H, I, S, J, K, L, M, N, O, Q, R; and subsubcategories denoted as A10, B10, H5, I11, S1, J17, K3, L1, M4, N8, O2, Q1, and R1. To maintain consistency, the webpage optimization system may merge and change categories in branches. For example, subcategories {C, D, E, F, G} are moved up to the category level in order to reduce the number of clicks. In some instances, the new webpage decision tree structure illustrated by second vertical tree visualization data 2804 can save three millions of clicks (25%) annually. In some embodiments, the webpage optimization system may avoid mixing subsubcategories with other categories (e.g., mixing category "3" with subcategories {O, Q, R}) to improve webpage navigation.

FIG. 29 illustrates example data 2900 comprising example statistical data, such as aggregated category statistical data 2902 (e.g., aggregated number of clicks and percentage clicks in categories over time) and aggregated subcategory statistical data 2904 (e.g., aggregated number of clicks and percentage clicks in subcategories over time), in accordance with some example embodiments. In some embodiments, the webpage optimization system described herein may generate the second vertical tree visualization data 2804 based on example data 2900. In some embodiments, the webpage optimization disclosed herein may receive the statistical data shown in FIG. 29 weekly to ensure that there is the similar distribution of contact reasons. As further shown in FIG. 29, customers had similar problems week after week.

Figure 30:
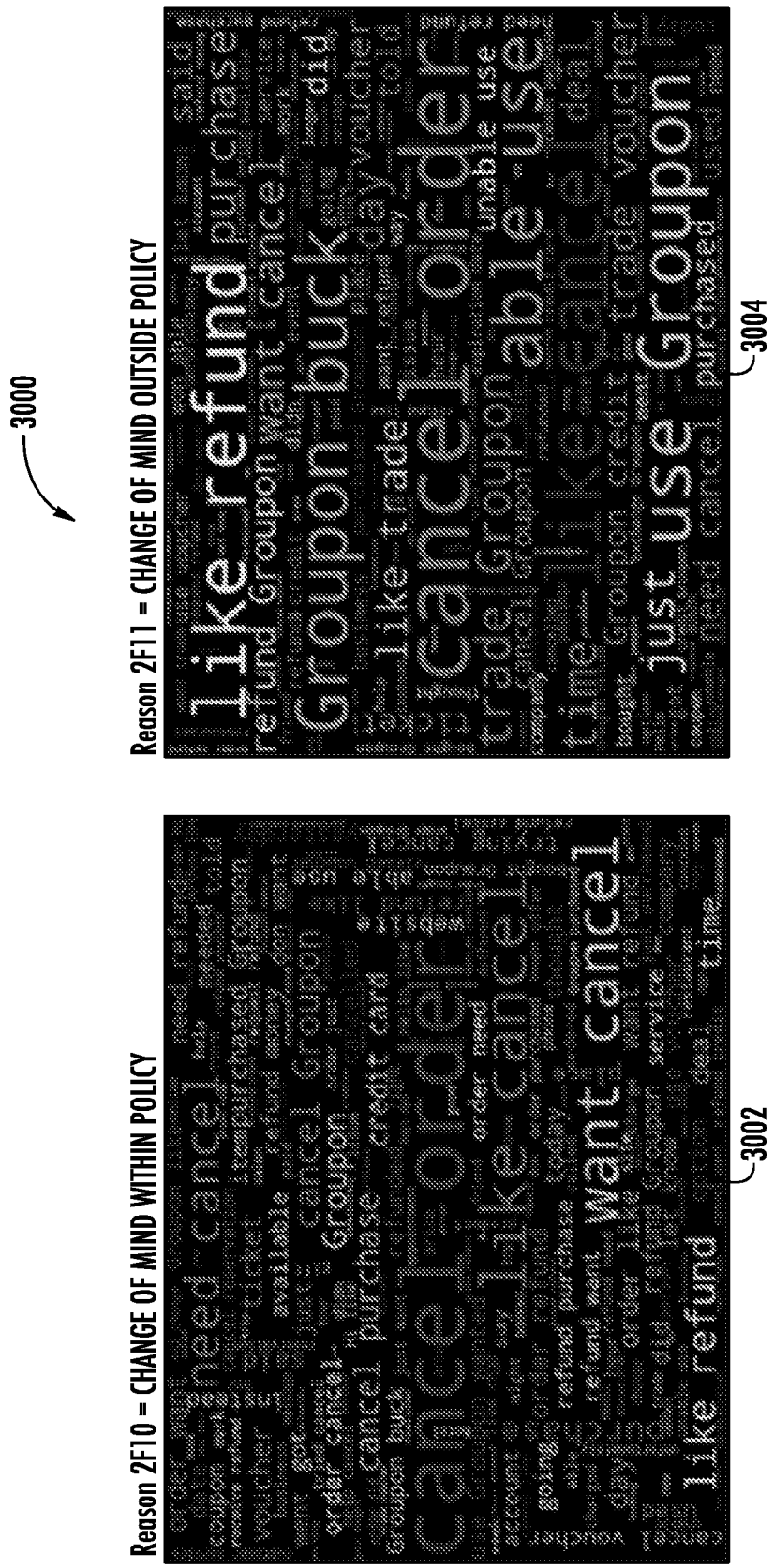
FIG. 30 illustrates example data 3000 comprising example first word cloud visualization data and example second word cloud visualization data in accordance with some example embodiments.

FIG. 30 illustrates example data 3000 comprising example first word cloud visualization data 3002 (e.g., "Reason 2F10=Change of mind within policy") and example second word cloud visualization data 3004 (e.g., "Reason 2F11=Change of mind outside policy") in accordance with some example embodiments. In some embodiments, the webpage optimization system may generate each of the example first word cloud visualization data 3002 and the example second word cloud visualization data 3004 based on aggregated and anonymized data of customers, such as the top 100 words in the textual problem description written by the customer. In some embodiments, larger font size may indicate more often phrase occurrence.

In some embodiments, the webpage optimization system may apply "hard tree reduction" to remove nodes visited below a predetermined threshold value. In some embodiments, the webpage optimization system may merge semantically similar options (e.g., automated based on keyword similarities) to reduce number of tree nodes. In some embodiments, the webpage optimization system may apply predictive models based on the textual data (e.g., Customer Contact Reason from chat, email and text grabbed from the website form) so that the customer service agents will not need to navigate the decision tree structure. In some embodiments, the webpage optimization system may implement, on the "Customer Service" website, a prompt with a potential customer need (e.g., Contact Reasons; leave nodes from the decision tree).

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the webpage optimization system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A computing system for optimizing a webpage, the computing system comprising:
 decision tree analysis (DTA) circuitry configured to
  receive first webpage decision tree data comprising a first webpage decision tree structure for a first set of webpage nodes,
  receive historical usage data comprising a historical number of clicks (HNC) value for each webpage node in the first set of webpage nodes, and
  determine a first average number of clicks (ANC) value for the first set of webpage nodes based on the first webpage decision tree data and the historical usage data;
 natural language processing (NLP) circuitry in communication with the DTA circuitry, wherein the NLP circuitry is configured to
  receive webpage node description data comprising a textual description data structure for each webpage node in the first set of webpage nodes, and
  generate semantic grouping data for the first set of webpage nodes based on the first webpage decision tree data and the webpage node description data; and
 decision tree optimization (DTO) circuitry in communication with the DTA circuitry and the NLP circuitry, wherein the DTO circuitry is configured to
  determine a second ANC value by applying an ANC optimization technique to the first set of webpage nodes,
  wherein the second ANC value is less than the first ANC value, and
  generate, based on the second ANC value and the semantic grouping data, second webpage decision tree data indicative of a second webpage decision tree structure for a second set of webpage nodes.

2. The computing system of claim 1, wherein the first set of webpage nodes comprises a first webpage node and a second webpage node, wherein the first webpage node is associated with a first category of the first webpage decision tree structure, wherein the second webpage node is associated with a second category of the first webpage decision tree structure, and wherein the DTO circuitry is further configured to:
 generate a third webpage node based on a joining of the first webpage node and the second webpage node,
 wherein the second set of webpage nodes comprises the third webpage node, and
 wherein the third webpage node is associated with a third category of the second decision tree structure.

3. The computing system of claim 1, wherein the first set of webpage nodes comprises a first webpage node and a second webpage node, wherein the first webpage node is associated with a first category of the first webpage decision tree structure, wherein the second webpage node is associated with the first category of the first webpage decision tree structure, and wherein the DTO circuitry is further configured to:
 generate a third webpage node based on a splitting of the first webpage node and the second webpage node; and
 generate a fourth webpage node based on the splitting of the first webpage node and the second webpage node,
 wherein the second set of webpage nodes comprises the third webpage node and the fourth webpage node,
 wherein the third webpage node is associated with a second category of the second decision tree structure, and
 wherein the fourth webpage node is associated with a third category of the second decision tree structure.

4. The computing system of claim 1, wherein the NLP circuitry is further configured to generate the semantic grouping data based on an unsupervised clustering technique.

5. The computing system of claim 1, wherein the DTO circuitry is further configured to determine the second ANC value based on a naive technique.

6. The computing system of claim 1, wherein the DTO circuitry is further configured to determine the second ANC value based on a greedy technique.

7. The computing system of claim 1, wherein the DTO circuitry is further configured to determine the second ANC value based on an exhaustive search technique.

8. The computing system of claim 1, wherein the DTO circuitry is further configured to determine a minimum ANC value based on the first set of webpage nodes, and wherein the second ANC value is the minimum ANC value.

9. The computing system of claim 1, wherein the webpage node description data is first webpage node description data, wherein the textual description data structure is a first textual description data structure, and wherein the DTO circuitry is further configured to generate second webpage node description data comprising a second textual description data structure for each webpage node in the second set of webpage nodes.

10. The computing system of claim 9, wherein the computing system further comprises decision tree visualization (DTV) circuitry in communication with the DTA circuitry, the NLP circuitry, the DTO circuitry, and a display device, and wherein the DTV circuitry is configured to generate a spreadsheet based on the second webpage decision tree data and the second webpage node description data.

11. The computing system of claim 1, wherein the computing system further comprises decision tree visualization (DTV) circuitry in communication with the DTA circuitry, the NLP circuitry, the DTO circuitry, and a display device, and wherein the DTV circuitry is configured to:
 generate DTV data indicative of the first webpage decision tree data, the second webpage decision tree data, or a combination thereof; and
 transmit the DTV data to the display device.

12. The computing system of claim 11, wherein the DTV circuitry is further configured to:
 generate first heatmap visualization data based on the first webpage decision tree data; and
 generate second heatmap visualization data based on the second webpage decision tree data,
 wherein the DTV data comprises the first heatmap visualization data and the second heatmap visualization data.

13. The computing system of claim 11, wherein the DTV circuitry is further configured to:
 generate first tree visualization data based on the first webpage decision tree data; and
 generate second tree visualization data based on the second webpage decision tree date,
 wherein the DTV data comprises the first tree visualization data and the second tree visualization data.

14. The computing system of claim 11, wherein the DTV circuitry is further configured to:
 generate first graph visualization data based on the first webpage decision tree data; and
 generate second graph visualization data based on the second webpage decision tree data, wherein the DTV data comprises the first graph visualization data and the second graph visualization data.

15. The computing system of claim 11, wherein the DTV circuitry is further configured to:
generate first word cloud visualization data based on the first webpage decision tree data; and
generate second word cloud visualization data based on the second webpage decision tree data,
wherein the DTV data comprises the first word cloud visualization data and the second word cloud visualization data.

16. The computing system of claim 1, wherein the computing system further comprises decision tree recommendation (DTR) circuitry in communication with the DTA circuitry, the NLP circuitry, and the DTO circuitry, and wherein the DTR circuitry is configured to:
generate machine learning prediction data based on the second webpage decision tree data; and
generate decision tree recommendation data based on the machine learning prediction data.

17. A computing method for optimizing a webpage, the computing method comprising:
receiving, by decision tree analysis (DTA) circuitry, first webpage decision tree data comprising a first webpage decision tree structure for a first set of webpage nodes;
receiving, by the DTA circuitry, historical usage data comprising a historical number of clicks (HNC) value for each webpage node in the first set of webpage nodes;
determining, by the DTA circuitry, a first average number of clicks (ANC) value for the first set of webpage nodes based on the first webpage decision tree data and the historical usage data;
receiving, by natural language processing (NLP) circuitry in communication with the DTA circuitry, webpage node description data comprising a textual description data structure for each webpage node in the first set of webpage nodes;
generating, by the NLP circuitry, semantic grouping data for the first set of webpage nodes based on the first webpage decision tree data and the webpage node description data;
determining, by decision tree optimization (DTO) circuitry in communication with the DTA circuitry and the NLP circuitry, a second ANC value by applying an ANC optimization technique to the first set of webpage nodes, wherein the second ANC value is less than the first ANC value; and
generating, by the DTO circuitry based on the second ANC value and the semantic grouping data, second webpage decision tree data indicative of a second webpage decision tree structure for a second set of webpage nodes.

18. The computing method of claim 17, wherein the first set of webpage nodes comprises a first webpage node and a second webpage node, wherein the first webpage node is associated with a first category of the first webpage decision tree structure, wherein the second webpage node is associated with a second category of the first webpage decision tree structure, and wherein the computing method further comprises:
generating, by the DTO circuitry, a third webpage node based on a joining of the first webpage node and the second webpage node,
wherein the second set of webpage nodes comprises the third webpage node, and
wherein the third webpage node is associated with a third category of the second decision tree structure.

19. The computing method of claim 17, wherein the first set of webpage nodes comprises a first webpage node and a second webpage node, wherein the first webpage node is associated with a first category of the first webpage decision tree structure, wherein the second webpage node is associated with the first category of the first webpage decision tree structure, and wherein the computing method further comprises:
generating, by the DTO circuitry, a third webpage node based on a splitting of the first webpage node and the second webpage node; and
generating, by the DTO circuitry, a fourth webpage node based on the splitting of the first webpage node and the second webpage node,
wherein the second set of webpage nodes comprises the third webpage node and the fourth webpage node,
wherein the third webpage node is associated with a second category of the second decision tree structure, and
wherein the fourth webpage node is associated with a third category of the second decision tree structure.

20. A computer program product for optimizing a webpage, the computer program product comprising at least one non-transitory computer-readable storage medium storing computer-executable program code instructions that, when executed by a computing system, cause the computing system to:
receive, by decision tree analysis (DTA) circuitry, first webpage decision tree data comprising a first webpage decision tree structure for a first set of webpage nodes;
receive, by the DTA circuitry, historical usage data comprising a historical number of clicks (HNC) value for each webpage node in the first set of webpage nodes;
determine, by the DTA circuitry a first average number of clicks (ANC) value for the first set of webpage nodes based on the first webpage decision tree data and the historical usage data;
receive, by natural language processing (NLP) circuitry in communication with the DTA circuitry, webpage node description data comprising a textual description data structure for each webpage node in the first set of webpage nodes;
generate, by the NLP circuitry, semantic grouping data for the first set of webpage nodes based on the first webpage decision tree data and the webpage node description data;
determine, by decision tree optimization (DTO) circuitry in communication with the DTA circuitry and the NLP circuitry, a second ANC value by applying an ANC optimization technique to the first set of webpage nodes, wherein the second ANC value is less than the first ANC value; and
generate, by the DTO circuitry based on the second ANC value and the semantic grouping data, second webpage decision tree data indicative of a second webpage decision tree structure for a second set of webpage nodes.

* * * * *